(12) United States Patent
Grossman et al.

(10) Patent No.: US 10,057,731 B2
(45) Date of Patent: Aug. 21, 2018

(54) IMAGE AND MESSAGE INTEGRATION SYSTEM AND METHOD

(71) Applicants: Andrew Grossman, Hopkins, MN (US); Kenneth F. Krutsch, Minnetonka, MN (US)

(72) Inventors: Andrew Grossman, Hopkins, MN (US); Kenneth F. Krutsch, Minnetonka, MN (US)

(73) Assignee: AMBIENT CONSULTING, LLC, Minneapolis, MN (US)

( * ) Notice: Subject to any disclaimer, the term of this patent is extended or adjusted under 35 U.S.C. 154(b) by 0 days.

(21) Appl. No.: 14/227,032

(22) Filed: Mar. 27, 2014

(65) Prior Publication Data

US 2015/0094106 A1    Apr. 2, 2015

Related U.S. Application Data

(63) Continuation-in-part of application No. 14/179,602, filed on Feb. 13, 2014, which is a continuation-in-part
(Continued)

(51) Int. Cl.
*H04W 4/12* (2009.01)
*H04W 4/18* (2009.01)
*H04M 1/725* (2006.01)

(52) U.S. Cl.
CPC ......... *H04W 4/12* (2013.01); *H04M 1/72552* (2013.01); *H04M 1/72555* (2013.01);
(Continued)

(58) Field of Classification Search
CPC ... H04W 4/12; H04W 4/185; H04M 1/72552; H04M 1/72555
(Continued)

(56) References Cited

U.S. PATENT DOCUMENTS 7,072,941 B2    7/2006 Griffin et al.
7,987,492 B2    7/2011 Liwerant et al.
(Continued)

FOREIGN PATENT DOCUMENTS

EP         1729173        12/2006

OTHER PUBLICATIONS

Dec. 30, 2014 PCT Search Report (Serial No. PCT/US2014/058588)—Our Matter 5196.
(Continued)

*Primary Examiner* — King Poon
*Assistant Examiner* — Vincent Peren
(74) *Attorney, Agent, or Firm* — Tysver Beck Evans, PLLC

(57) ABSTRACT

A system and method are presented to allow text-based communication between users concerning an image in the form of an image-message. The originator of the communication uses a mobile device app to select an image and enter appropriate text. The recipient mobile device receives an image-message, and then displays the text superimposed over the image. The recipient can enter reply text, which will then be shown superimposed over the image as part of a message stream. The recipient can also alter the image, with the altered image being transmitted back to the originator. When the reply message is active, the altered image is displayed behind the message stream. The user can select an earlier message in the stream to view the image associated with that earlier message.

19 Claims, 16 Drawing Sheets

Related U.S. Application Data of application No. 14/043,385, filed on Oct. 1, 2013, now Pat. No. 9,894,022.

(52) U.S. Cl.
CPC .......... *H04W 4/185* (2013.01); *H04M 1/7255* (2013.01); *H04M 2250/22* (2013.01)

(58) Field of Classification Search
USPC .......................... 455/466; 715/230; 345/629
See application file for complete search history.

(56) References Cited

U.S. PATENT DOCUMENTS

| | | | |
|---|---|---|---|
| 8,199,188 B2 | 6/2012 | Amling et al. | |
| 8,225,335 B2 | 7/2012 | Glenner et al. | |
| 8,606,297 B1* | 12/2013 | Simkhai | H04W 4/02 |
| | | | 455/456.2 |
| 8,701,020 B1* | 4/2014 | Fulcher | G06F 3/0488 |
| | | | 715/753 |
| 9,031,963 B2 | 5/2015 | Anand et al. | |
| 9,042,923 B1* | 5/2015 | Mirho | H04W 4/14 |
| | | | 455/412.1 |
| 2002/0099552 A1 | 7/2002 | Rubin et al. | |
| 2004/0199922 A1 | 10/2004 | Krutsch et al. | |
| 2004/0267387 A1 | 12/2004 | Samadani | |
| 2005/0008343 A1 | 1/2005 | Frohlich et al. | |
| 2005/0108233 A1 | 5/2005 | Metsatahti et al. | |
| 2005/0216568 A1* | 9/2005 | Walkush | G06Q 10/107 |
| | | | 709/207 |
| 2006/0008256 A1 | 1/2006 | Khedouri et al. | |
| 2006/0041848 A1* | 2/2006 | Lira | G06Q 10/107 |
| | | | 715/805 |
| 2006/0148500 A1 | 7/2006 | Glenner et al. | |
| 2007/0143791 A1 | 6/2007 | Sammarco | |
| 2007/0173267 A1* | 7/2007 | Klassen et al. | 455/466 |
| 2007/0198925 A1* | 8/2007 | He et al. | 715/530 |
| 2007/0300260 A1 | 12/2007 | Holm et al. | |
| 2008/0028023 A1 | 1/2008 | Locke | |
| 2008/0092047 A1 | 4/2008 | Fealkoff et al. | |
| 2008/0146254 A1* | 6/2008 | Groeger | H04L 12/5895 |
| | | | 455/466 |
| 2008/0307322 A1* | 12/2008 | Stochosky | G06F 3/0481 |
| | | | 715/752 |
| 2009/0225788 A1 | 9/2009 | Kephart et al. | |
| 2009/0254459 A1 | 10/2009 | Williams et al. | |
| 2010/0029335 A1 | 2/2010 | Vartanian | |
| 2010/0199182 A1 | 8/2010 | Lanza et al. | |
| 2010/0262618 A1 | 10/2010 | Hedinsson | |
| 2011/0087749 A1* | 4/2011 | Swink | H04L 51/32 |
| | | | 709/206 |
| 2011/0087972 A1* | 4/2011 | Swink | H04L 51/32 |
| | | | 715/752 |
| 2011/0131610 A1* | 6/2011 | Lee | H04N 21/234318 |
| | | | 725/48 |
| 2011/0106721 A1 | 7/2011 | Nickerson et al. | |
| 2011/0173540 A1 | 7/2011 | Britton et al. | |
| 2011/0264532 A1 | 10/2011 | Chan et al. | |
| 2012/0066594 A1 | 3/2012 | Gavade et al. | |
| 2012/0150698 A1 | 6/2012 | McClements, IV | |
| 2012/0151320 A1 | 6/2012 | McClements, IV | |
| 2012/0157134 A1* | 6/2012 | Lee | H04L 12/583 |
| | | | 455/466 |
| 2012/0179978 A1* | 7/2012 | Klassen | G06F 3/0482 |
| | | | 715/752 |
| 2012/0189282 A1 | 7/2012 | Wyatt et al. | |
| 2012/0190388 A1* | 7/2012 | Castleman | H04L 51/04 |
| | | | 455/466 |
| 2012/0204191 A1* | 8/2012 | Shia | G06Q 10/10 |
| | | | 719/318 |
| 2012/0209907 A1 | 8/2012 | Andrews et al. | |
| 2012/0284426 A1 | 11/2012 | Smith et al. | |
| 2012/0290907 A1 | 11/2012 | Smith et al. | |
| 2012/0317499 A1* | 12/2012 | Shen | G06Q 10/107 |
| | | | 715/752 |
| 2012/0321271 A1 | 12/2012 | Baldwin et al. | |
| 2013/0013699 A1* | 1/2013 | Huxley | G06Q 10/101 |
| | | | 709/206 |
| 2013/0022330 A1 | 1/2013 | Carter et al. | |
| 2013/0091205 A1 | 4/2013 | Kotler et al. | |
| 2013/0173531 A1 | 7/2013 | Rinearson et al. | |
| 2013/0178961 A1 | 7/2013 | Ly et al. | |
| 2013/0263002 A1 | 10/2013 | Park | |
| 2013/0283144 A1* | 10/2013 | Roh | G06F 17/241 |
| | | | 715/230 |
| 2014/0063174 A1 | 3/2014 | Junuzovic et al. | |
| 2014/0073298 A1 | 3/2014 | Rossmann | |
| 2014/0089415 A1 | 3/2014 | Huang et al. | |
| 2014/0146177 A1 | 5/2014 | Pacor et al. | |
| 2014/0150042 A1 | 5/2014 | Pacor et al. | |
| 2014/0163980 A1 | 6/2014 | Tesch et al. | |
| 2014/0164927 A1 | 6/2014 | Salaverry et al. | |
| 2014/0344712 A1* | 11/2014 | Okazawa | G06F 3/048 |
| | | | 715/752 |
| 2014/0348394 A1 | 11/2014 | Salaverry et al. | |
| 2015/0039706 A1* | 2/2015 | Zilmer | H04L 51/36 |
| | | | 709/206 |
| 2015/0095433 A1 | 4/2015 | Grossman et al. | |
| 2015/0281243 A1 | 10/2015 | Das et al. | |
| 2015/0282115 A1 | 10/2015 | Pitt et al. | |
| 2015/0282282 A1 | 10/2015 | Breuer et al. | |
| 2016/0006781 A1 | 1/2016 | Glenner et al. | |
| 2016/0100149 A1 | 4/2016 | Sharma et al. | |

OTHER PUBLICATIONS

Feb. 19, 2015 PCT Search Report (Serial No. PCT/US2014/058523)—Our Matter 5194.
Sep. 2, 2015 USPTO Office Action (U.S. Appl. No. 14/043,385)—Our Matter 5069.
Oct. 7, 2015 USPTO Office Action (U.S. Appl. No. 14/521,576)—Our Matter 5184.
Apr. 14, 2016 PCT Preliminary Examination Report (Serial No. PCT/US2014/058523)—Our Matter 5194.
Apr. 14, 2016 PCT Preliminary Examination Report (Serial No. PCT/US2014/058588)—Our Matter 5196.
May 4, 2016 USPTO Office Action (U.S. Appl. No. 14/179,602)—Our Matter 5085.
Mar. 7, 2016 USPTO Office Action (U.S. Appl. No. 14/043,385)—Our Matter 5069.
Nov. 28, 2016 USPTO Office Action (U.S. Appl. No. 14/542,599)—Our Matter 5193.
Feb. 6, 2017 USPTO Office Action (U.S. Appl. No. 14/179,602)—Our Matter 5085.
Mar. 11, 2017 USPTO Office Action (U.S. Appl. No. 14/542,599)—Our Matter 5193.

\* cited by examiner

Fig. 15
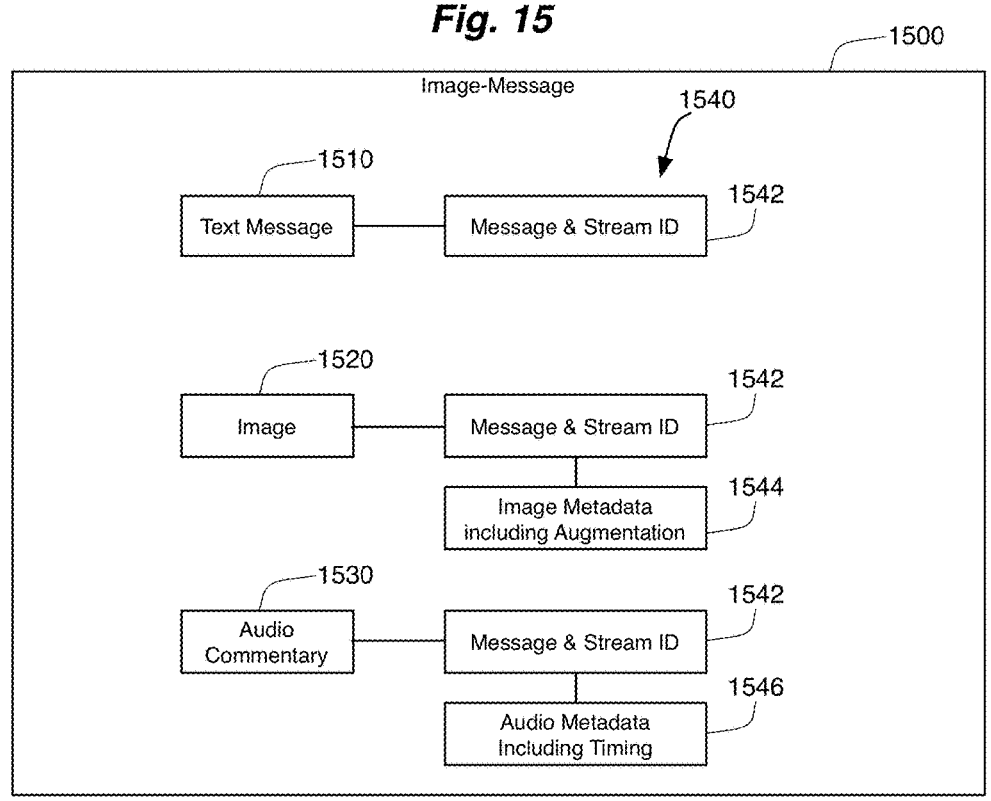
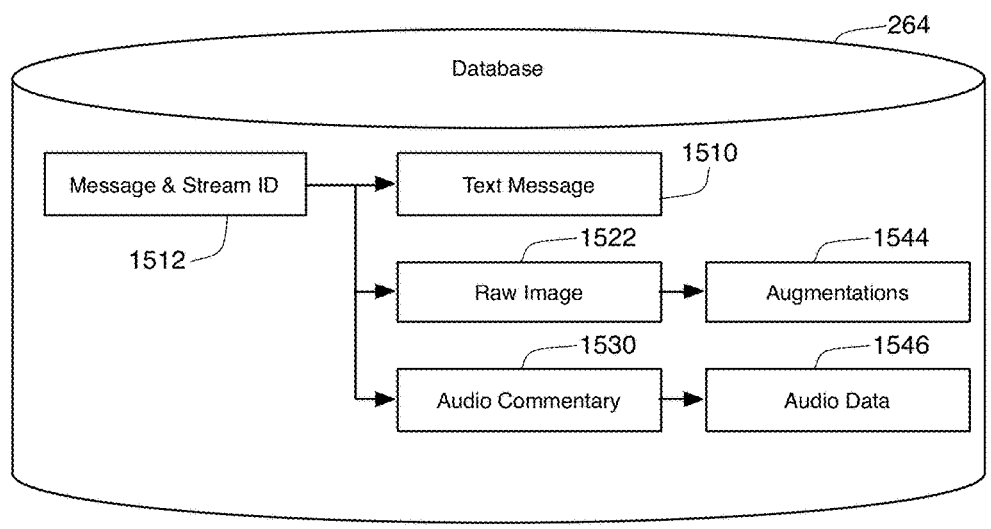

IMAGE AND MESSAGE INTEGRATION SYSTEM AND METHOD

RELATED APPLICATION

This application is a continuation-in-part of U.S. patent application Ser. No. 14/179,602, filed on Feb. 13, 2014, which is itself a continuation-in-part of U.S. patent application Ser. No. 14/043,385, filed on Oct. 1, 2013, both of which are hereby incorporated by reference in their entireties. This application is also related to the content found in U.S. patent application Ser. Nos. 13/832,177; 13/832,744; 13/834,347; all filed on Mar. 15, 2013, and U.S. patent application Ser. No. 13/947,016, filed on Jul. 19, 2013, all of which are hereby incorporated by reference.

FIELD OF THE INVENTION

The present application relates to the field of image-centered communication between users. More particularly, the described embodiments relate to a system and method for bi-directional, text-based communications centered on a visual element.

SUMMARY

The described embodiments disclose a text messaging communication system centered around a visual element. Text messages between two or more parties are displayed on a mobile device overlaid on the visual element that is the topic of the conversation. The originator of the message sends the text message and, for example, a photograph from the originator's mobile device to the recipient mobile device. In one embodiment, the message text and photographic image are sent over a standard MMS messaging protocol via an existing MMS message app operating on the mobile devices. In other embodiments, lower-level operating system APIs are used to send and receive MMS messages.

When the recipient views the message, it is overlaid over the transmitted image. The recipient may choose to remove the overlaid message, such as by tapping on the image or using a swiping gesture on the touchscreen. Another tap or an opposite swipe on the image would return the message stream. The recipient can respond to the message by sending text back to the originator. When the originator views the response, the original and responsive messages will both be overlaid over the image.

In one embodiment, a recipient may choose to augment the image as part of their responsive message. For instance, the recipient may choose to draw on the image using their finger, to create an arrow, to add a label, or to crop the image to a defined area. These augmentations are then associated with the responsive text message.

Because the originator may also choose to respond to the responsive message by including their own augmentation of the image, a message stream may include numerous message texts sent between the originator and recipient, with each message text having a different image augmentation. The image-message app running on the mobile device is able to alter the background image behind the message texts to reflect these augmentations. In one embodiment, the user may manually select a particular message text, such as by pressing on the message bubble displaying the text on the user's touchscreen. A particular message can also be selected by scrolling through a message stream so that the selected message appears at particular position on the touchscreen. For example, the message that appears on the top, middle, or bottom portion of the touchscreen can automatically become the selected message text. When a particular message text is selected, it is highlighted so that the user can immediately identify the selected message. In addition, the visual element that is associated with that message will be displayed behind the message stream. In another embodiment, the user must manually select a link embedded in the message text to display the image associated with that text.

In yet another embodiment, the recipient may elect a new image in place of augmenting the existing image. This new image is then associated with that message text and displayed whenever that text is selected by the messaging app. Additional messages in the message stream may then augment this new image.

BRIEF DESCRIPTION OF THE DRAWINGS

FIG. 15 is a schematic view showing metadata sent in an image-message and its relationship to data found in a database.

DETAILED DESCRIPTION

Audio-Image System 100

Figure 1:
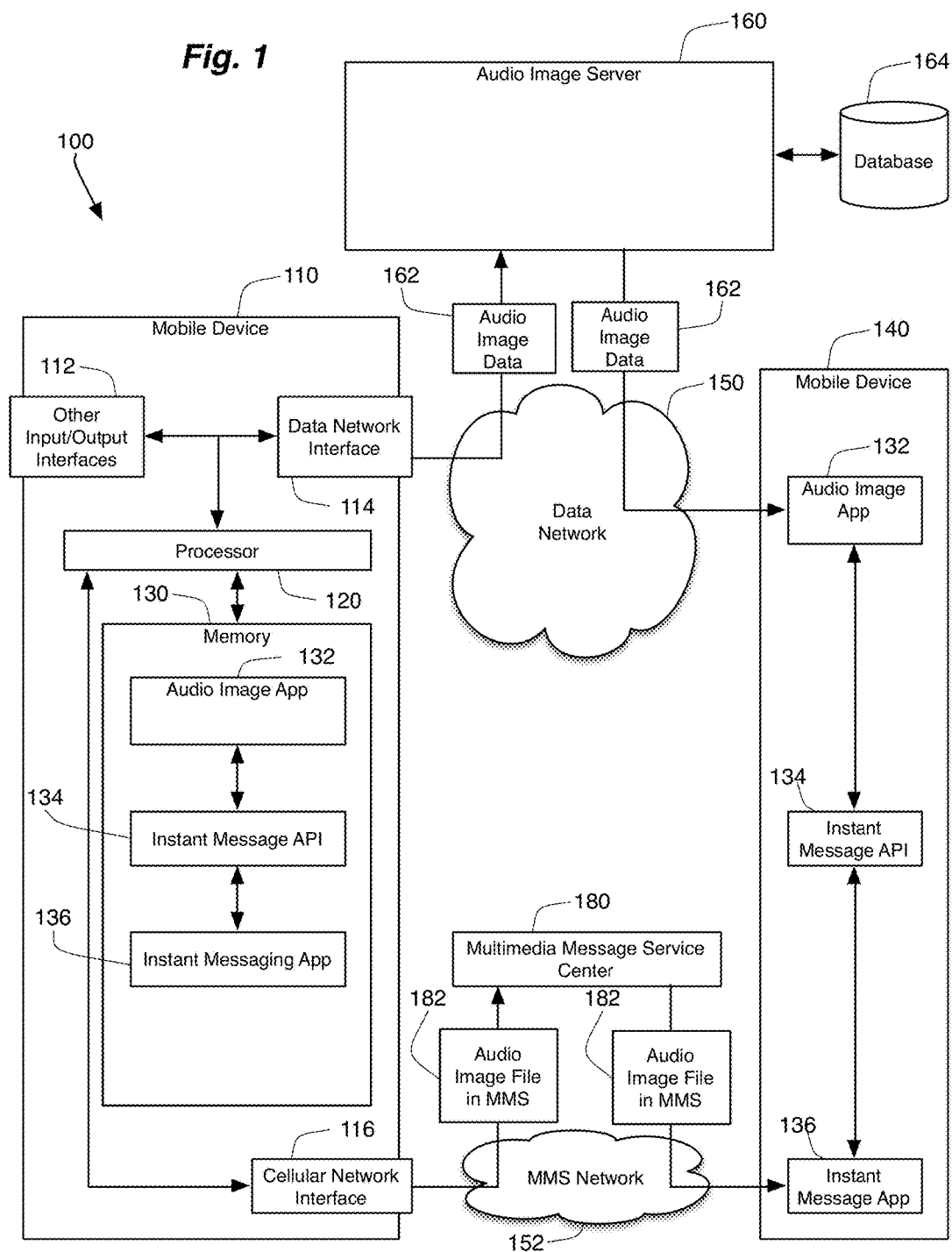
FIG. 1 is a schematic view of a system implemented audio-image data as described in the parent application.

FIG. 1 shows a system 100 in which a mobile device 110 can create and transmit audio-image files to other users. The incorporated parent U.S. patent application Ser. Nos. 14/180,484 and 14/043,385, describe this system in some detail. Not all of the details from these applications will be repeated in this disclosure. The system 100 allows the sharing of audio-image messages, enabling users to have a bi-directional, queued, audio communication about a particular visual image or presentation. Two mobile devices 110, 140 can communicate audio-image files over a wide area data network 150 (such as the Internet) and an MMS Network 152.

Communications over network 150 utilize an audio-image server 160 to send audio-image data 162 to mobile device 140. The audio-image server 160 stores data about the audio-image data 162 that is transmitted between the devices 110, 140 in its database 164. The server 160 is a programmed computing device operating a processor under control of server programming that is stored on tangible, non-transitory memory in the audio-image server 160. The processor is preferably a general purpose CPU of the type provided by Intel Corporation or Advanced Micro Devices, Inc., operating under the control of a general purpose operating system such as Mac OS by Apple, Inc., Windows by Microsoft Corporation (Redmond, Wash.), or Linux (available from a variety of sources under open source licensing restrictions). The server is in further communication with a database that contains information on audio-image users, the audio-image addresses of the users, and audio-image files. Although the server 160 is described above as a single computer with a single processor, it would be straightforward to implement server 160 as a plurality of separate physical computers operating under common or cooperative programming. Consequently, the terms server, server computer, or server computers should all be viewed as covering situations utilizing one, or more than one, physical computer.

The mobile device 110 is also able to communicate through a multimedia messaging service center ("MMS center") 180 over MMS network 152 in order to send an audio-image within an MMS message to mobile device 140. The mobile devices 110, 140 can take the form of a smart phone or tablet computer. As such, the devices 110, 140 will have a variety of input/output interfaces 112, including a microphone, a camera, and a touch screen user interface. The touch screen is able to present visual information to the user and receive touch-based input from the user.

The mobile device 110 communicates over the data network 150 through a data network interface 114. Similarly, the mobile device 110 communicates over the MMS network 152 via a cellular network interface 116. In the preferred embodiment, the mobile device 110 sends multimedia messaging service ("MMS") messages via the standards provided by a cellular network 152, meaning that the MMS network 152 used for data messages is the same network 152 that is used by the mobile device 110 to make cellular voice calls. In some embodiments, the provider of the cellular data network also provides an interface to the wide area data network 150, meaning that the MMS or cellular network 152 could be utilized to send proprietary audio-image data messages 162 as well as MMS messages 182. This means that the actual physical network interface 118, 120 used by the mobile device 110 is relatively unimportant, and the use of particular interfaces 118, 120 and networks 150, 152 in this description is, for the most part, merely exemplary.

The mobile devices 110, 140 also include a processor 120 and a memory 130. The processor 120 can be a general purpose CPU, such as those provided by Intel Corporation (Mountain View, Calif.) or Advanced Micro Devices, Inc. (Sunnyvale, Calif.), or a mobile specific processor, such as those designed by ARM Holdings (Cambridge, UK). Mobile devices such as device 110, 140 generally use specific operating systems designed for such devices, such as iOS from Apple Inc. (Cupertino, Calif.) or ANDROID OS from Google Inc. (Menlo Park, Calif.). The operating system is stored on memory 130 and is used by the processor 120 to provide a user interface for the touch screen display, handle communications for the device 110, and to manage and provide services to applications (or apps) that are stored in the memory 130. In FIG. 1, memory 130 is shown containing an audio-image app 132 and an instant messaging app 136. These two apps 132, 136 communicate with one another through an instant messaging API 134 that provides a method for the apps 132, 136 to communicate data and instructions to one another.

The audio-image app 132 is responsible for the creation of audio-image files, the management of multiple audio-image files, and the sending and receiving of audio-image files. This app 132 instructs the processor 120 how to combine recorded audio data with images into an audio-image file. In some embodiments, the audio-image file will take the form of a standard video file. Once the audio-image file is created and the user has selected one or more recipients, the audio-image app 132 determines whether the audio-image file should be sent to the recipient using the audio-image server 160 and its proprietary communications channel, or should be sent via the MMS network 152. This determination may be based on whether or not the recipient mobile device 140 is utilizing the audio-image app 132. A mobile device is considered to be using the audio-image app 132 if the app 132 is installed on the device and the user has registered themselves as a user of the app 132 with the audio-image server 160. The parent applications explain how this determination is made in greater detail.

If the audio-image file 162 is to be transmitted to the recipient mobile device 140 via the audio-image server 160, the mobile device 110 will transmit to the server 160 the audio-image video file along with metadata that identifies the sender and recipient of the file 162. The server 160 stores this information in database 164, and informs the recipient mobile device 140 that it has received an audio-image file 162. When the user of the recipient mobile device 140 selects an audio-image file through app 132, the app 132 presents the image and plays the most recently added audio commentary. The app 132 would also give the user of device 140 the ability to record an audio reply commentary to the image, and then send that reply back to mobile device 110 in the form of a new audio-image file.

If the audio-image file is to be sent from device 110 via the MMS network 152, the audio-image app 132 will create an MMS message 182 and attach the audio-image file. This message 182 will be delivered to an MMS center 180 that receives MMS messages for mobile device 184. As explained in the parent applications, the audio-image files 162, 182 can be delivered as a video file if the recipient mobile device 140 does not use the audio-image app 132, and as separate data elements if the mobile device 140 does use the app 132. In still further embodiments, the MMS message 182 only delivers data to the recipient's app 132 identifying information about the audio-image data that is stored in the database 164. The recipient mobile device 140 will then download the audio-image file from the audio-image server using that identifying information. In an alternative embodiment, SMS is used (rather than MMS) to send the identifying information about the audio-image data to the recipient mobile device 140. In still other embodiments, other proprietary messaging formats could be used, such as iMessage from Apple, and WhatsApp from WhatsApp Inc. (Mountain View, Calif.).

Image-Message System 200

Figure 2:
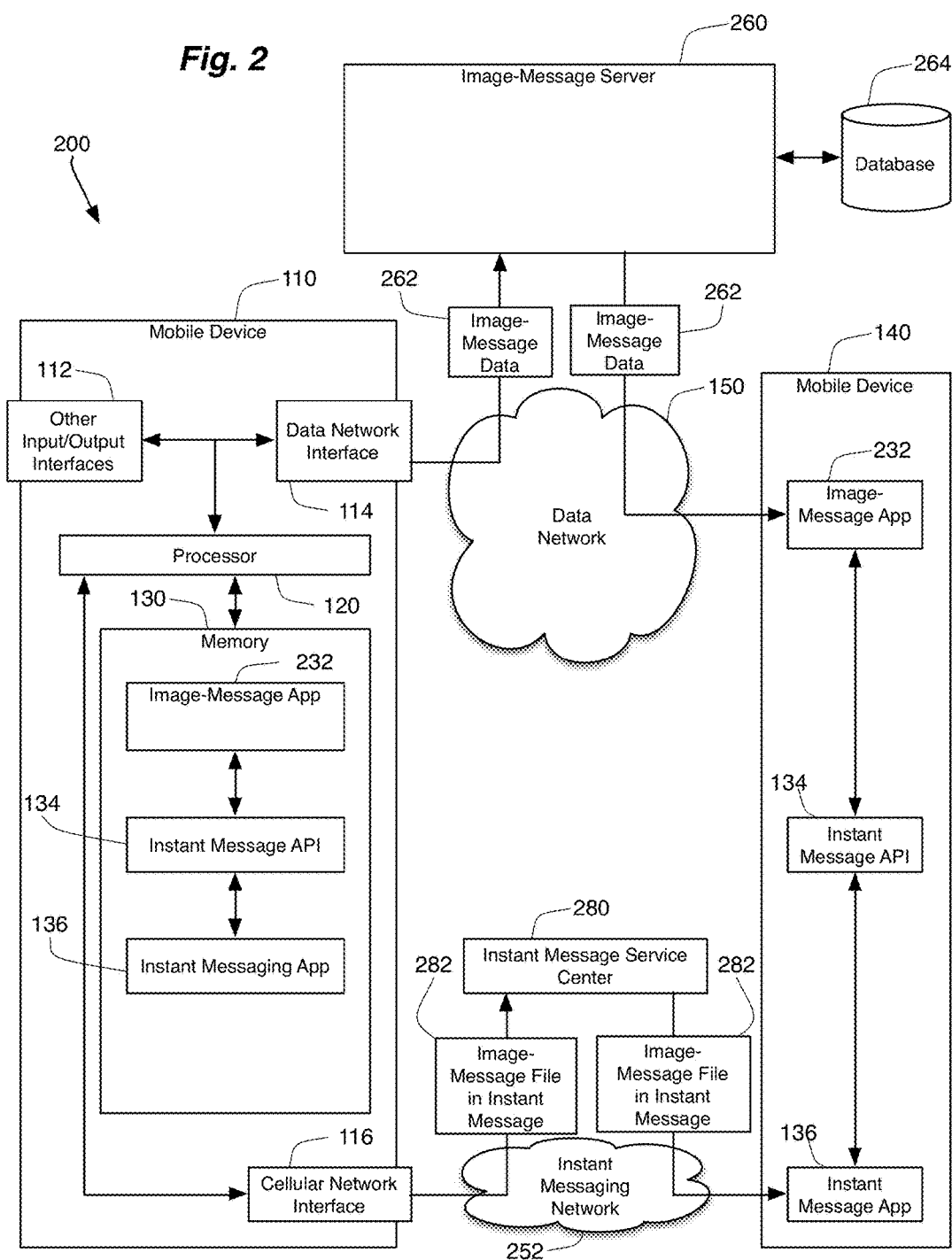
FIG. 2 is a schematic view of a system implemented image messaging.

FIG. 2 shows an image-message system 200 that is similar to the audio-image system 100. Although the two systems 100, 200 can easily be merged together, it is contemplated that the image-message system 200 will sometimes be implemented without the ability to handle audio-image messaging. The elements of the image-message system 200 are, however, very similar to the elements of the audio-image system 100 in that a mobile device 110 communicates with a second mobile device 140 over a data network 150 and an instant messaging network 282 (such as MMS). So that the similarities are made clear, identical elements in FIGS. 1 and 2 share the same reference numerals.

The transmitting mobile device 110 contains an image-message app 232 in its memory 130. When this app 232 operates on processor 120, the mobile device 110 is capable of creating, responding to, and displaying image-messages. In the present application, an "image-message" is a text-based message concerning a visual element that is displayed with the text superimposed over the visual element. In one embodiment, the image-message is sent as part of an instant message 282 (such as an MMS, iMessage, or WhatsApp message) utilizing the instant message app 136 on the device 110. The image-message app 232 interfaces with this app 136 utilizing an instant message API 134, as described in more detail in the parent applications. The recipient mobile device 232 receives the instant message 282 via its instant messaging app 136.

The manner in which the image-message file can be included in the instant message 282 can vary, similar to the way in which an audio-image file can be embedded in MMS message 182 as described in the parent applications. For example, the image-message data can be attached directly to the instant message. For instance, MMS messages contain multiple parts defined according to the MIME protocol. An image-message could comprise one or more MIME parts in an MMS message, or could be embedded in a single part having newly created MIME type. When the mobile device 140 receives a message 282 having a part with this custom MIME type, the receiving instant messaging app 136 uses the audio-image app 132 as a helper app, or sends the message 282 directly to the image-message app 232 via API 134.

Alternatively, the image-message app 132 can be used as the default messaging app on the recipient device 140, with the user turning to the image-message app 132 to handle both image-messages and normal instant messages. The normal instant messages are handed by the app 132 much like they are handled by standard instant message app 136. Image-message files attached to the instant message 182 are recognized by the audio-image app 132 and handled as described below. The two message types can co-mingle in the interface, with normal instant message streams being handled side-by-side with image-message streams as described herein.

In other embodiments, the attachment of image-message data to an instant message 282 does not prevent these messages 282 from being received, organized, and partially displayed by the standard instant message app 136. This scenario would be helpful in situations where the recipient mobile device 140 did not have the image-message app 262 installed. As explained below, the normal instant message app 136 may be able to identify the text portion of the image-message communication, and perhaps even the visual element that is sent as part of the image-message file. However, the standard instant message app 136 would not be able to overlay the text messages over the image file, nor would the instant message app understand any metadata that defines image augmentations. These aspects of the image-message app 232 are described in more detail below.

In other embodiments, the image-message app 232 on the transmitting device 110 sends image-message data 262 to the recipient mobile device 140 via the data network 150 and the image-message server 260. The image-message data 262 is received by the server 260 and stored in its database 264. The image-message server 260 then communicates to the image-message app 232 on the recipient mobile device 140 that it has received an image-message. The app 232 then requests the image-message data from the database 264 and displays the message stream to the user.

These embodiments could also be combined, with the image-message data being transmitted via data network 150 and the image-message server 260, but with the notification being handled via the instant messaging network 252. For instance, the image-message app 232 could send the image-message data 262 to the image-message server 260, and then send an SMS message via the instant messaging network 252 informing the recipient image-message app 232 that the image-message data 262 is available for download.

Image-Message Stream Interface

Figure 3:
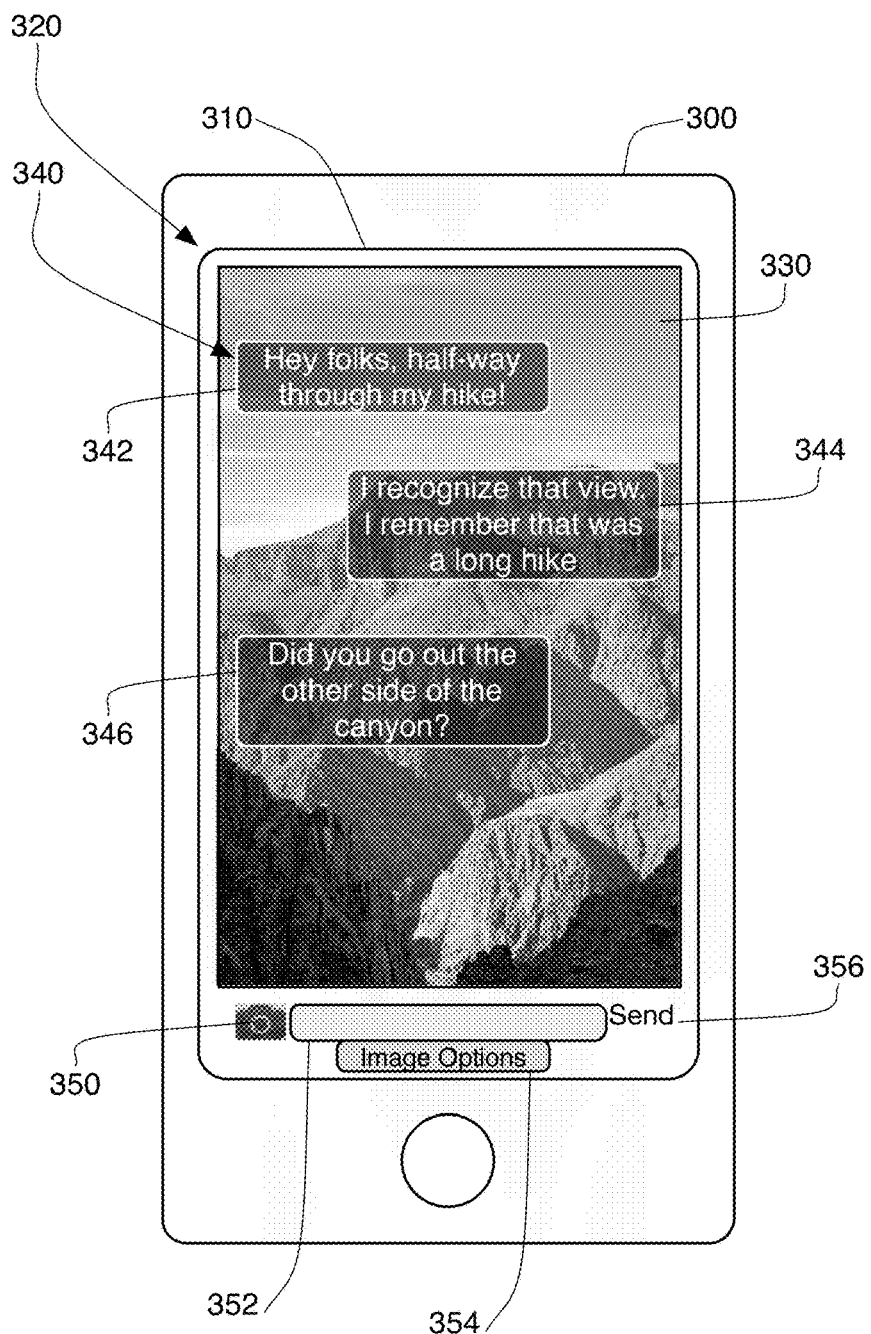
FIG. 3 is a plan view of a mobile device displaying a user interface provided by an app with a message stream overlaid on visual element.

FIG. 3 shows an example interface 320 produced by the image-message app 232 on a mobile device 300. The mobile device 300 includes a touchscreen 310 that displays the interface 320 to the user. The interface includes a visual element 330; in this case a photograph of a canyon. On top of the visual element 330 is superimposed a message stream 340 comprised of three message "bubbles" 342, 344, 346. Each message bubble 342-346 is pushed to the left or right side of the interface 340 to indicate message texts sent by the remote participant (on the left) and message texts sent by the user of the device 300 (on the right). By placing the message texts over the visual element 330, the interface 320 emphasizes that these communications directly concern photograph 330.

The interface 320 on display 310 also includes various reply tools 350-356. Text area 352 allows a user to input a text reply to the latest message 346 from the remote sender. After the user selects text location 352, the image-message app 232 will allow text entry into this location 352. In one embodiment, text entry is made via a slide-up keyboard, as is standard for apps operating in the iOS and ANDROID environments. In another embodiment, a microphone icon (not shown) within the text area 352 will allow a user to speak their response. Their spoken response will be heard by the microphone 112 within the mobile device 300 and get converted into text. When the user has finished their textual response, they would press the send 356 area of interface 320. At that point, their message will be sent to the remote device, and interface 320 would be altered to add their sent message to a new text bubble on the right hand of the displayed message stream 340. The reply tools also includes a camera icon 350, which allows the user to select a different image for the visual element 330 associated with their reply, and an image options button 354, which allows the user to alter or augment the existing image 330 as part of their reply. The use of these elements 350, 352 is describe in greater detail below.

Figure 4:
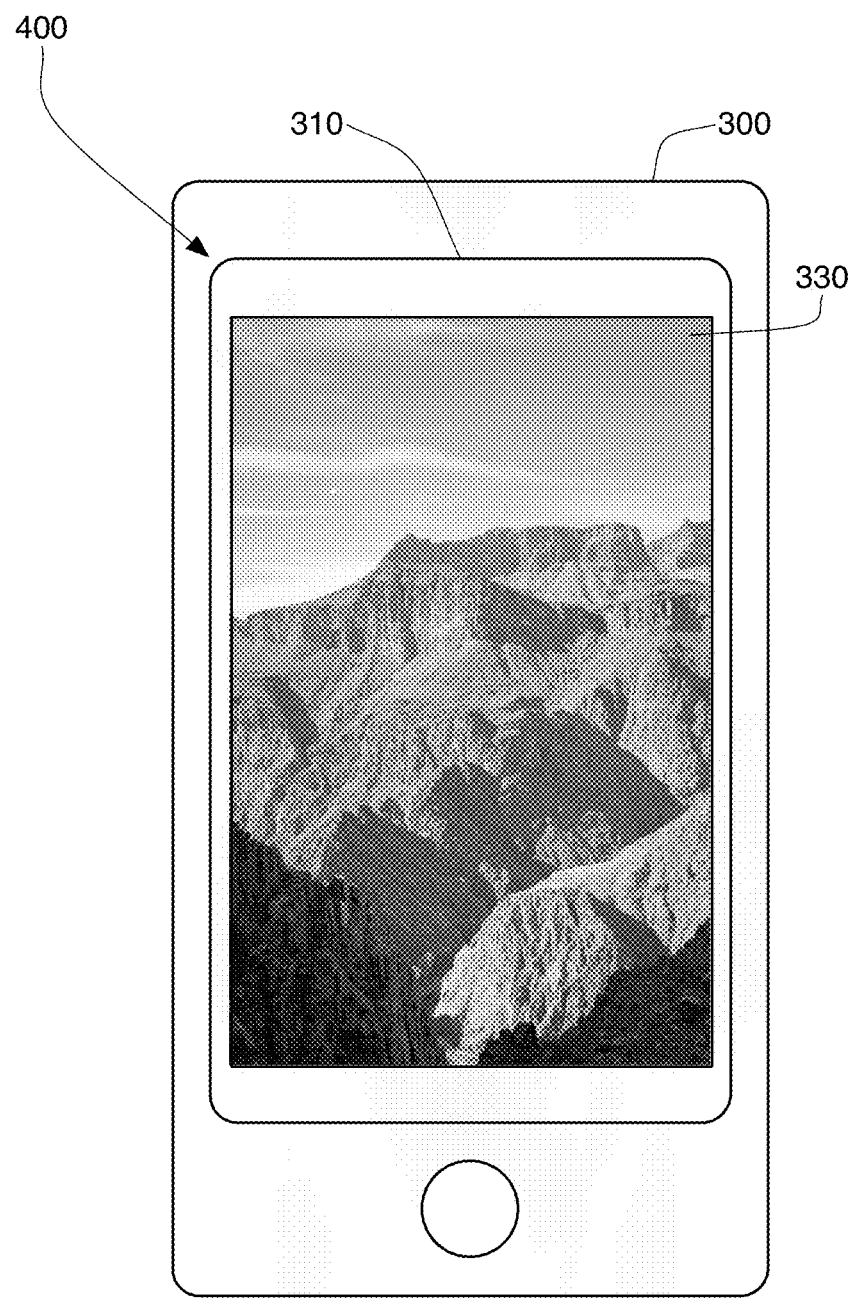
FIG. 4 is a plan view of the mobile device of FIG. 3 displaying the image with the message stream removed.

Although the overlay of the message stream 340 over the visual element 330 adds impact to the individual messages 342-346 and directly ties these messages 342-346 to the image 330, the message stream 340 can also impede a full appreciation for the image 330. To overcome this difficulty, the interface 320 allows the user to remove the message stream from the display 310 by simply tapping on the image 330. A single tap with a finger will remove the message stream 340 and the reply tools 350-356, leaving only the visual element 330, as shown in interface 400 on FIG. 4. Another tap on the screen 310 will return the user to interface 320 and the message stream 340. Alternatively, the user could remove the message stream 340 by "swiping" the screen 310 (dragging a finger over the screen in a particular direction). An opposite swipe back could return the message stream 340.

Figure 5:
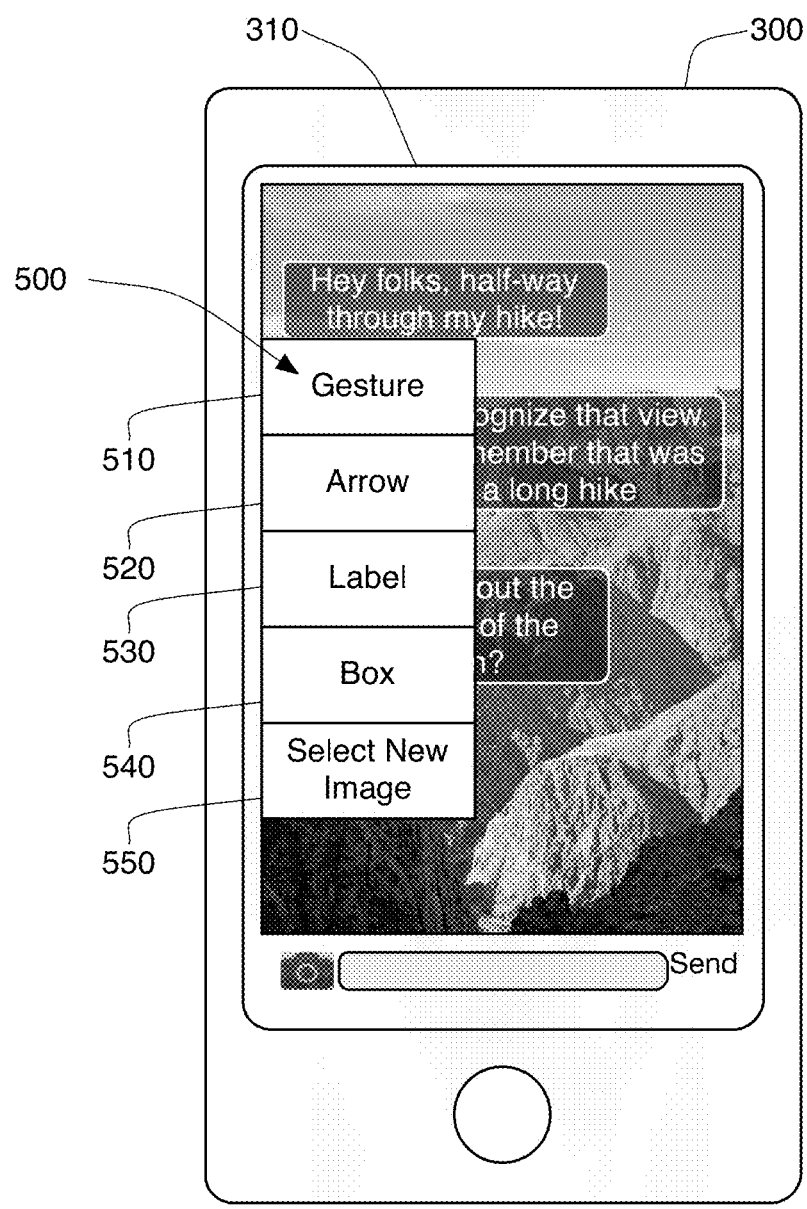
FIG. 5 is a plan view of the mobile device of FIG. 3 displaying an image augmentation menu.

The image-message app 232 is designed to allow the user to make alterations to the visual element 330 as part of their reply to the current message stream 340. To alter or augment the image 330, the user presses the image options button 354. In response, the image-message app 232 presents menu 500 to the user, as shown in FIG. 5. In other embodiments, the image options menu 500 will be displayed whenever the user makes a certain gesture on the touchscreen 310, such as sliding a finger across the screen from left to right.

The options in the image options menu 500 are very similar to the options described for augmenting an audio-image message in the parent applications. The techniques described in those applications are equally applicable to alterations/augmentations of image-messages. In particular, the menu 500 allows the user to add a gesture 510, arrow 520, or label 530 to the image 330. The menu 500 also allows a user to define a box 540 for cropping or zooming the image 330, or to select an entirely new image 550.

Figure 6:
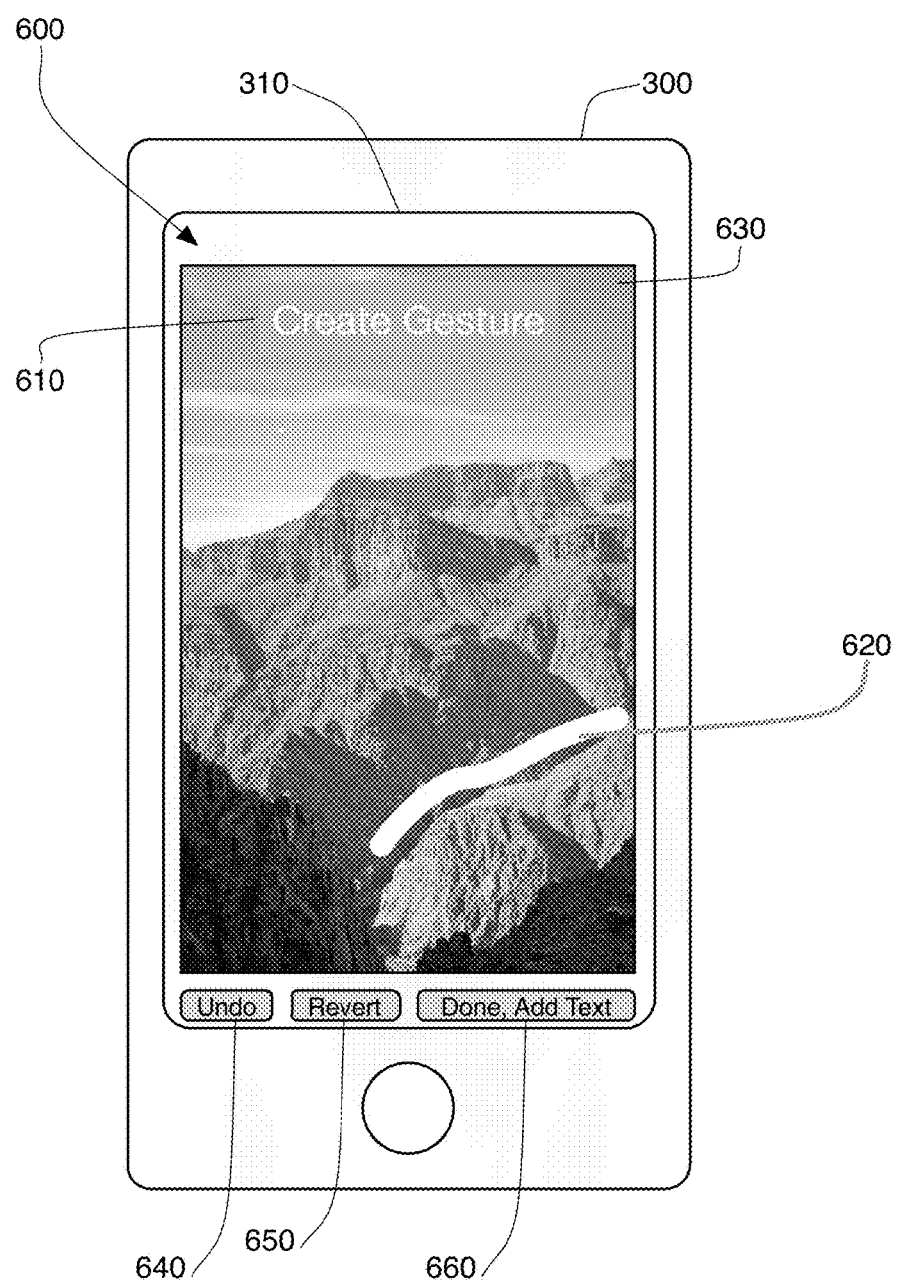
FIG. 6 is a plan view of the mobile device of FIG. 3 displaying a gesture input interface.

If the user selects to add a gesture by choosing selection 510 from menu 500, the gesture creation interface 600 is displayed. In this context, creating a gesture is similar to "drawing" on the image 330. The interface includes a title 610 to instruct the user on what to do. The title 610 may include detailed instructions, such as "Create a dot by pressing a location on the image; Create a line by dragging your finger across the image." Alternatively, the label 610 may just provide an indication of the current interface, such as the "Create Gesture" title 610 shown in FIG. 6. In FIG. 6, the user has created a line across the image 330 by dragging their finger over the image 330 in interface 600. This results in the creation of an augmented image 630, which modifies the original image 330 with whatever augmentations 620 or other changes are desired by the user. If the user is unhappy with their augmentation 620, the undo button 640 allows them to take back the last addition to the augmented image 630.

The revert button 650 is similar to the undo button 340, in that it can remove all augmentations 620 made during use of the interface 600. In the preferred embodiment, the revert button 650 can also allow the user to select an even earlier version of the image 330 to augment. Since each party to a message stream 340 is allowed to augment the visual element 330, a particular stream 340 may contain numerous different versions of the visual element 330. By default, a user that is augmenting the image 330 will be presented with the latest version of the image 330 in interface 600. If the user wishes to revert to an earlier version of the image, the revert button can be used to select among all of the alternative versions found in the message stream 340.

Figure 7:
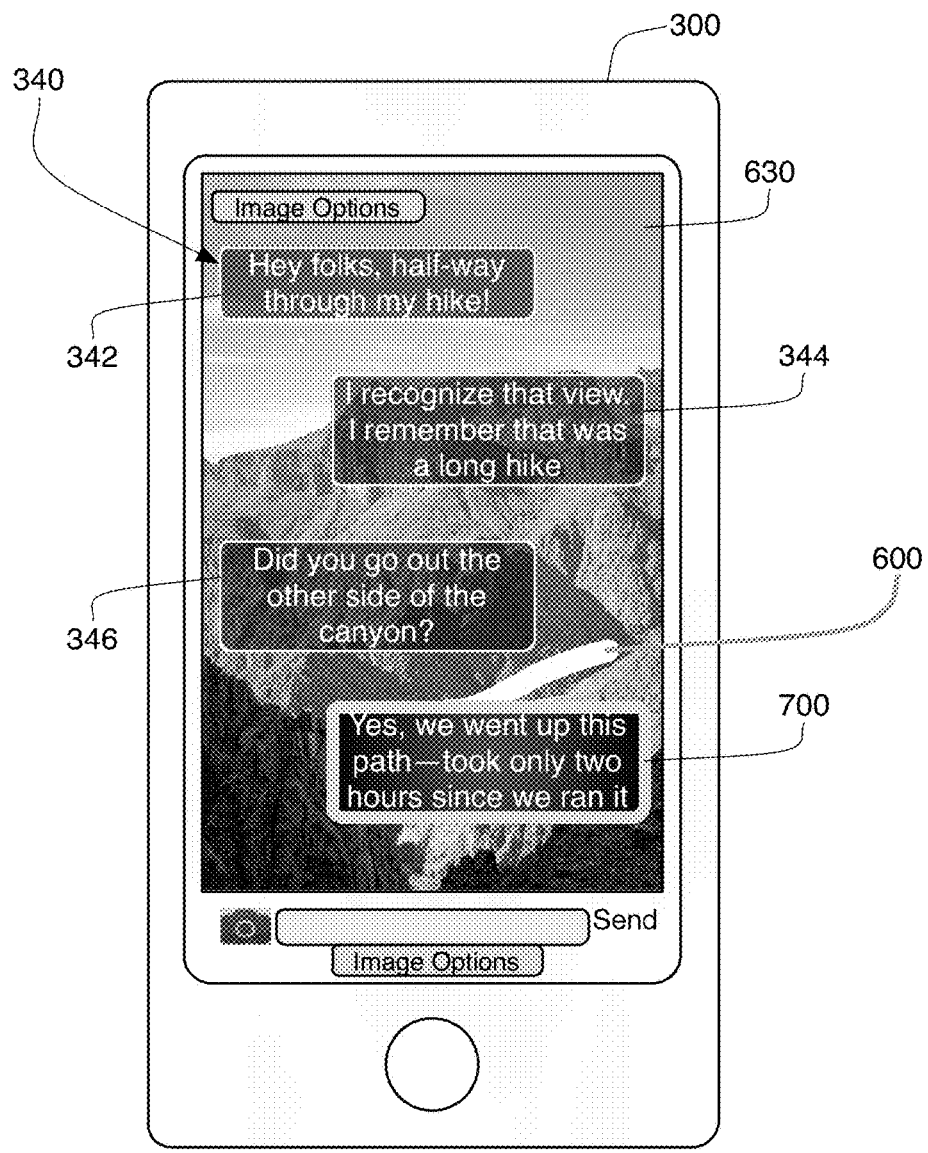
FIG. 7 is a plan view of the mobile device of FIG. 6 displaying an additional message text with a gesture image augmentation.

The power of creating an augmented image 630 is the image-message app's ability to combine this new image version 630 with a textual response as part of the message stream 340. After the user has finished adding their gesture or gestures 620 to the image 330, the user will press the "Done, Add Text" button 630. This opens the text input location 352, allowing the user to type or speak a textual response that will be sent to the other parties in the message stream 340. This textual response will be forever linked to the augmented image 630. For example, FIG. 7 shows a new text bubble 700 in the message stream associated with the augmented image 630. Note that this new text bubble 700 includes a broader highlight surrounding it, which indicates that this text bubble 700 is the active text message (as opposed to text messages 342, 344, 346). The background visual element 630 is therefore the augmented image 630 that is associated with this text message 700.

In one embodiment, a user could select any other message bubble 342-346 in the message stream 340, such as by pressing on that message bubble 342-346. This would remove the highlight around message test 700 and instead highlight the selected message. The background shown behind the message stream 340 would then show the visual element associated with that message text. In the above example, only message text 700 altered the original image 330. Consequently, all of the earlier message texts 342-346 would be associated with the original image 330. Pressing any of these text bubbles 342-346 would therefor highlight that bubble and update the background to image 330.

In an alternative embodiment, the selected message text is determined automatically by its position on the mobile device screen 310. In this embodiment, the visual element 360 that is displayed behind the message stream 340 is that image which is identified with the text message shown at the bottom (or top) of the user's screen. By dragging a finger on the screen, the user can show different portions of a message stream, with the background image reflecting the message located at the selected-message position. If a user wishes to override this display, the user can select a different message to see the visual element associated with that message.

Figure 8:
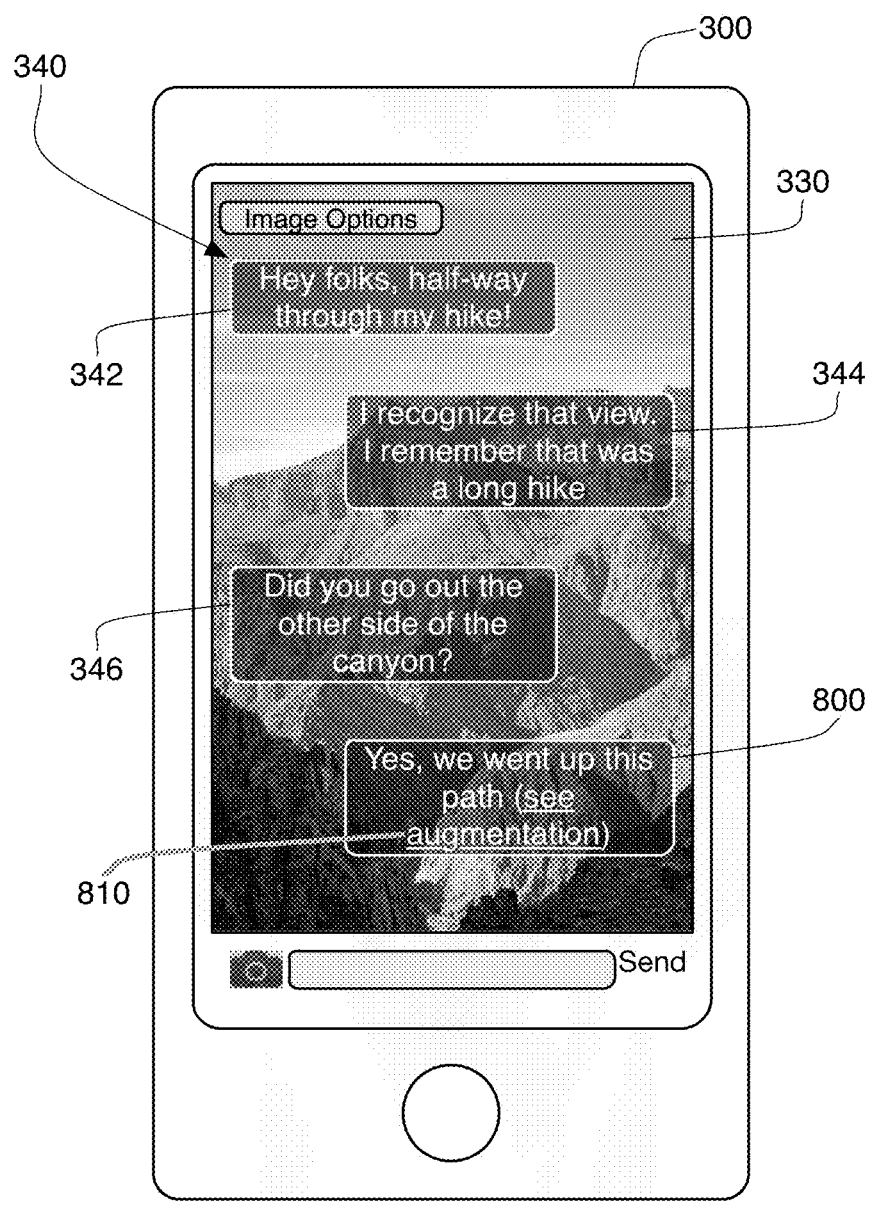
FIG. 8 is a plan view of the mobile device of FIG. 3 showing an alternative embodiment for displaying an additional message text with image augmentation using a link.
Figure 9:
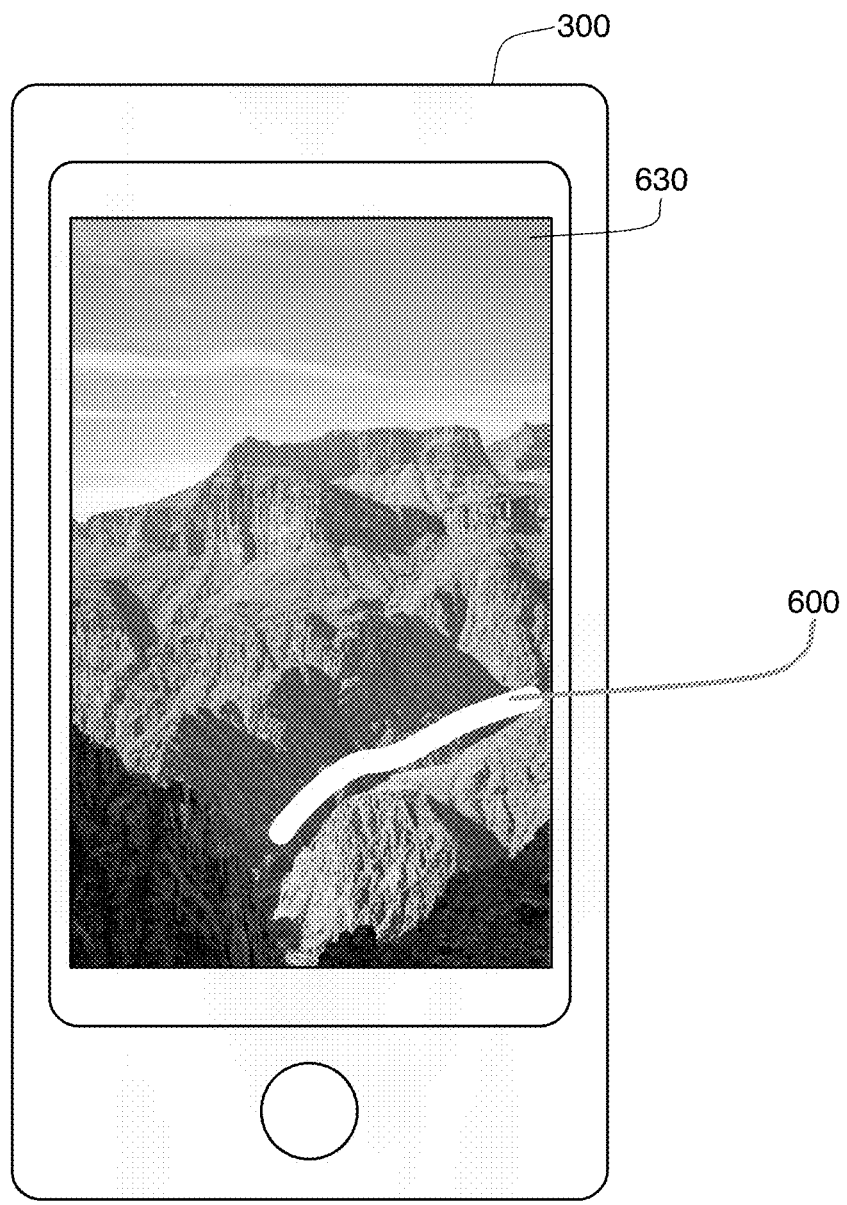
FIG. 9 is a plan view of the mobile device of FIG. 8 displaying the image augmentation after selecting the link.

FIG. 8 shows an alternative embodiment where the background shown behind the message stream remains unchanged regardless of the augmentations made in later text messages. Consequently, the background would remain the original image 330 regardless of which message was currently "active." Instead, message texts that are associated with augmentations to this image include a link, such as shown in message text 800 in FIG. 8. The link in this case is a brief underlined phrase, such as "see augmentation." The phrase could be any standard phrase, such as "see altered image" or "see new image." Alternatively, the phrase could automatically reflect the actual augmentation created by the user (such as "see drawn path", "see gesture", "see label", "see cropped portion", etc.). It is also possible to allow users to input the language of the link. In other embodiments, the link is not a readable phrase, but an icon that represents the new augmented image. For example, a message bubble 342-346 could contain a thumbnail image showing the new augmented image. Regardless of the form of the link, a user viewing the message stream 340 can select the link 810 and see the augmented image. FIG. 9 shows the augmented image 630 standing alone, as would be displayed upon selection of link 810. The user can return to the message stream 340 and background image 330 (as shown in FIG. 8) by simply pressing the augmented image 630 in FIG. 9.

In other embodiments, pressing the link will play an animation that implements the augmentation, such as "zooming" into a zoom box or playing the recorded gestures in the same manner in which the gesture was created. This animation can take place in a stand-alone screen with the message stream 340 removed, such as shown in FIG. 9. Alternatively, the animation can occur in the background with the message stream 340 still present, such as shown in FIG. 8. Where the message bubble 800 remains on the screen, user controls for the animation effects can be inserted into the message bubble 800. For example, a pause/play button and a video scrubber control can be placed within the same bubble 800 as the text message, allowing the viewer to control the playback of the animation and to replay the effect as desired.

Figure 10:
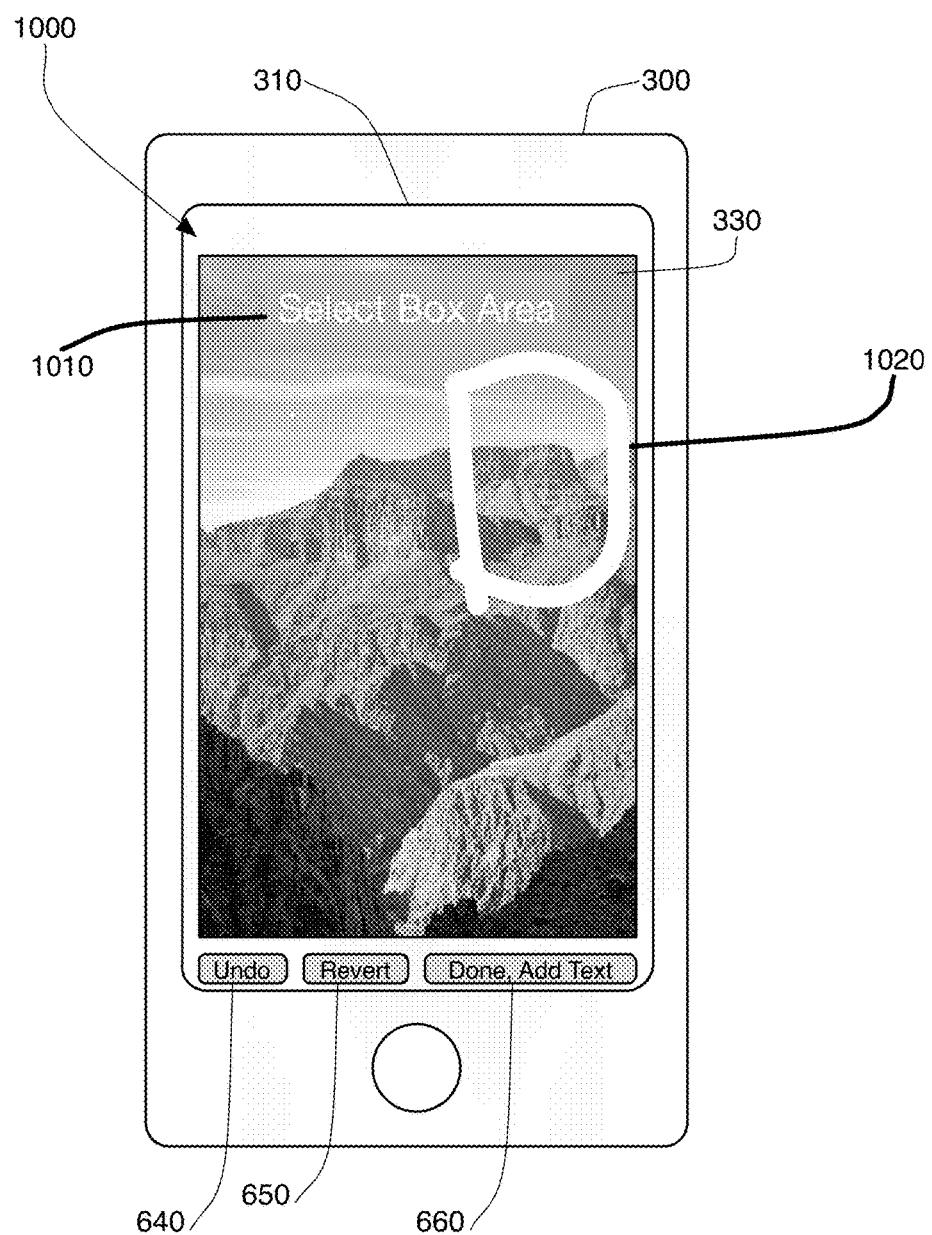
FIG. 10 is a plan view of the mobile device of FIG. 3 displaying a box input interface.

As explained above, each recipient of an image-message is able to compose a reply and add their own augmentation to the image. These augmentations may build on the latest augmented image, or may be built off of an earlier image version. For example, the other party to the message stream 340 in FIG. 7 may elect to compose their own response using an image augmentation. As shown in FIG. 10, this user selected to create a crop box (using menu element 540), and decided to base their augmentation on the original image 330 and not the augmented image 630. To get to this interface 1000 shown in FIG. 10, the user would have selected the image options button 354, selected menu element 540 from the image options menu 500), and then clicked the revert button 650 to select the original image 330.

Figure 11:
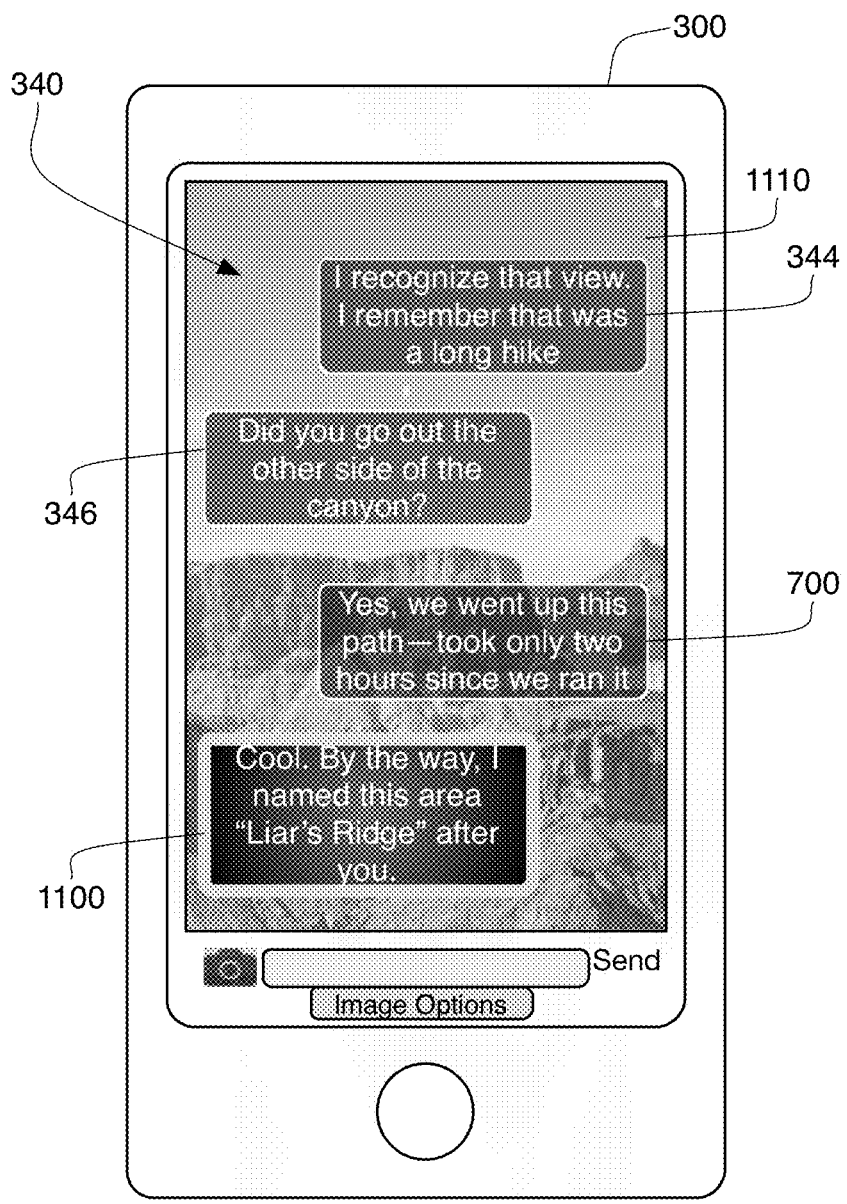
FIG. 11 is a plan view of the mobile device of FIG. 10 displaying an additional message text with a box-based image augmentation.
Figure 12:
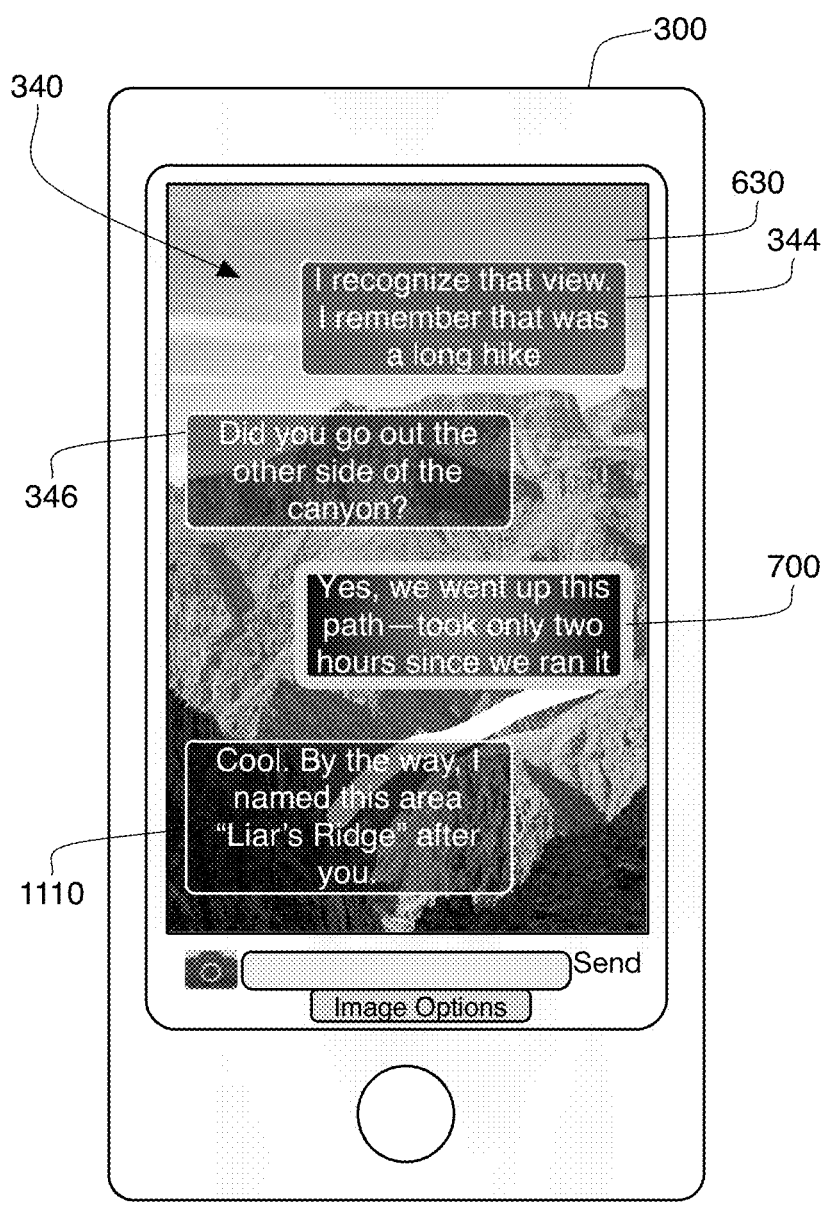
FIG. 12 is a plan view of the mobile device of FIG. 11 showing a selection of a previous text message.

As explained in the parent application, a user can select a box for cropping or zooming an image 330 either by manipulating corners of a rectangle or by drawing a freehand rectangle on the screen 310. In FIG. 10, the user has drawn a freehand rectangle 1020 to select a portion of the original image 330. To crop the image 330 to this area, the user could select a crop button (not shown in FIG. 10), or could simply press inside their freehand rectangle 1020. Next, the user would push the Done, Add Text button 660, and then add a text message to be associated with this augmented image. The new message and altered image would then be sent to the other members of the message stream 340. FIG. 11 shows the new augmented image 1110, formed by cropping around a box generally defined by the freehand rectangle 1020, with the user's new text message in box 1100. FIG. 11 shows that message bubble 1100 is highlighted, which again informs the user that the background image 1110 is associated with this message. As explained above, the user can manually select a different message bubble in the message stream 340, and the background image will change to reflect the image associated with that message. For example, FIG. 12 shows that augmented image 630 is displayed behind the message stream 340 when the user selects (presses) message bubble 700.

As explained in the parent applications, a user can also alter a visual element in an image-message by selecting the arrow 520 or label 530 option from menu 500. When creating an arrow, the user selects the beginning and end point of the arrow, as well as other relevant features (such as width and color of the arrow, the size of the arrow head, etc.). The image-message app 232 will then add the desired arrow to the image. When creating a label, the user can select the location of the label, define any lead lines, and choose other parameters for the label (such as the width and color of the lead line, and the font, size, and color of the label text, background color, etc.). The desired label will then be added to the image as a new augmented image. Some embodiments further allow the user to create an audio tag for a particular location on the image. When creating an audio tag, the user selects the area of the image to be tagged and then records an audio description of this image element. The recipient will see an indication of the audio tag when they view the image. The tag may be, for example, a "play" triangle icon located at the tagged location in the image. When this icon is pressed, the audio tag is played back to the user.

In one embodiment, a responding user may elect to use an entirely new image via menu element 550. If the user selects this option 550, the image-message app 232 will present an interface for a user to select (or acquire through a camera 112) a new image. The new image then becomes associated with the reply message text input by the user in the same manner in which the augmented images 630, 1100 became associated with message texts 700, 1110, respectively. In one embodiment, the camera icon 350 shown in FIG. 3 allows the user to immediately take a new image using the on-board camera 112 without having to go through the image options menu 500.

Method

Figure 13:
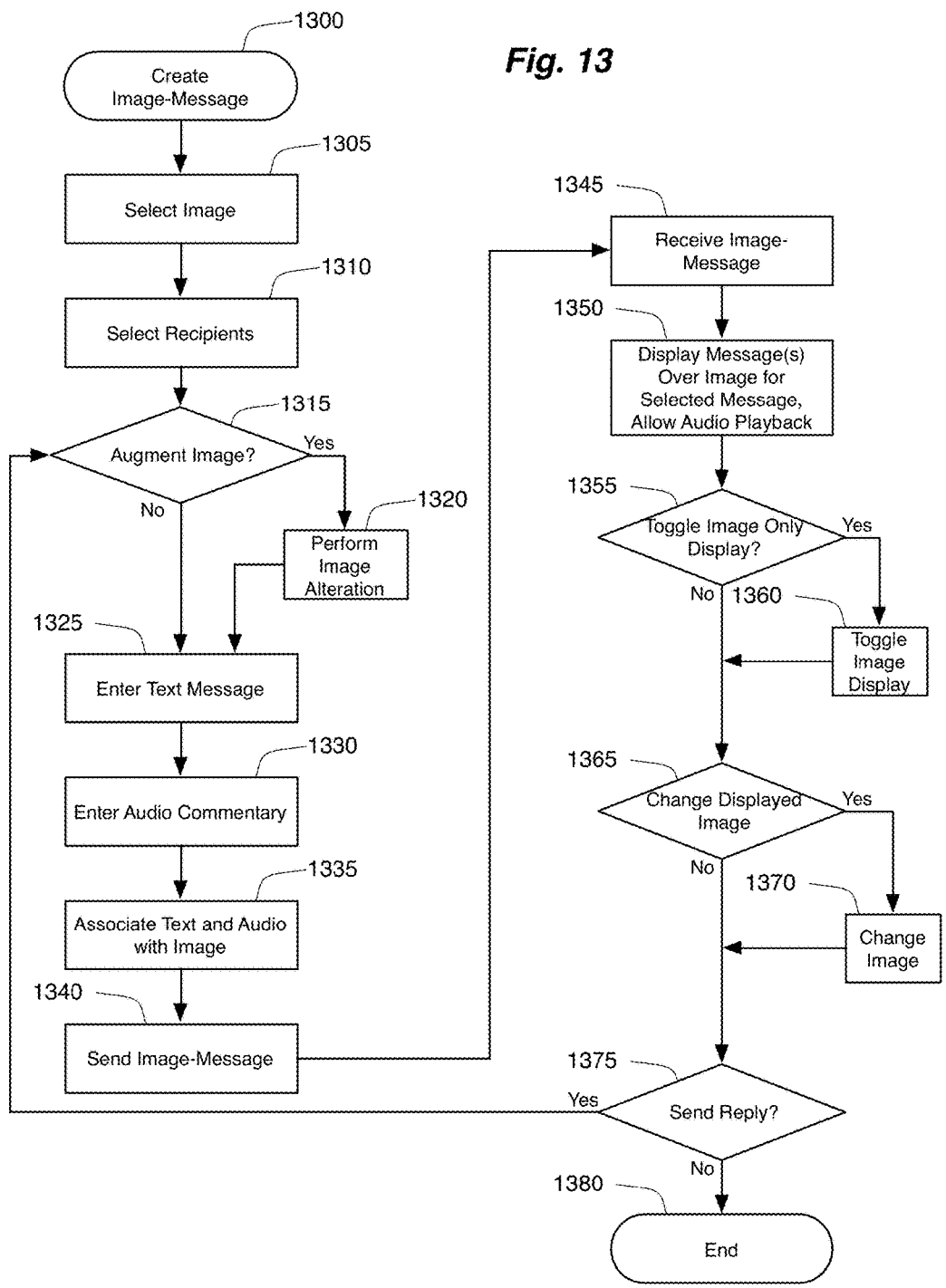
FIG. 13 is a flow chart showing a method of creating, responding to, and displaying an image-message.

FIG. 13 shows a method 1300 that can be implemented on the processor 120 of mobile device 110. The process 1300 starts with the user selecting a visual element or image at step 1305 using the image-message app 232. The app 232 may recall this image from among the images already stored on the memory 130 of the mobile device. Alternatively, the image may be acquired by the user using a camera 112 embedded in the mobile device 110. In yet another embodiment, the image could be acquired from a remote photo storage server accessed by the mobile device 110 across the data network 150. As is explained in more detail in the parent applications, it is possible that the selected visual element could also be a video file or a collection of multiple still images. It is even possible that the user can select and merge multiple still images into a single collage image. After the image is acquired, the user will select the recipient or recipients of the image-message in step 1310.

At step 1315, the sender must determine whether they wish to augment the selected photo before sending the message. This augmentation, performed in step 1320, can take the form of any of the augmentations shown in image options menu 500 and described in the parent applications. Other types of augmentations are also possible and are well known in the prior art, including color correction, white balance, tilt correction, desaturation, distortion, etc.

Whether the image has been altered or not, step 1325 has the user enter a text message to be transmitted along with the image. As explained in the parent applications, the user is also allowed to add an audio message to the image. If the user desires this, the audio message is recorded at step 1330. At step 1335, the text message, any audio commentary, and the image (with any desired augmentation) are associated with one another. This can be accomplished in a variety of ways, as described in more detail in connection with FIG. 15 below.

At step 1340, the image-message is sent to the recipient mobile device. In the preferred embodiment, the image-message is sent with a unique message identifier. This message identifier can be generated locally by the image-message app 232, or can be generated by the server 260 and communicated with the image-message app 232 over the data network 150. The sending of the image-message to the recipient mobile device in step 1340 can be accompanied by a message sent to the server 260 informing the server 260 that the image-message corresponding to the message identifier has been sent. This server message may also include the entire content of the image-message. In other embodiments, the image-message sent to the recipient mobile device may contain a different version of the augmented image than the server message sent to the server 260. For example, the text message sent to the recipient mobile device can include the rendered image as altered by the user's augmentation instructions (received in step 1320), while the server message may instead contain the original image and the actual instructions input by the user.

At step 1345, the recipient device receives the image-message. The "receipt" of the image-message may itself be a multi-step process. For example, the instant message transmitting the image-message may itself only contain an identifier for the image-message data 262 stored in the database 264. The identifier may be a simple reference number that is understand by the image-message server 260 to refer to a particular image-message in database 264. In this case, the image-message app 232 would need to already know how to locate the image-message server 260 over network 150 in order to request the appropriate data. Alternatively, the identifier may take the form of a network address for the data, in which the address identifies both the network location of the server 260 and the particular data to be requested from the server 260. In either case, the image-message app 232 on the recipient device will use this identifier to request the content of the image-message from the image-message server 260. The image-message server 260 will respond to this request by transmitting the image-message data 262 to the recipient mobile device. Alternatively, the image-message data may be fully contained within the MMS communication 282.

After the image-message has been received, the image-message app 232 will display the received image with the message stream overlaid on top of the image. If this is the first message in the message stream, then the image-message obtained in step 1345 will contain the entire image. In most cases, this image will be stored in a file that has been compressed using a well-known compression standard, such as a JPG, GIF, or PNG image file. With the first message in a stream, the only the text that will be displayed on top of this image will be the text from this first message.

If this is not the first message in the message stream, then all of the messages within the stream will be displayed. In addition, it is possible that the image-message data acquired in step 1345 for this non-first message will not contain the image to be displayed behind the message stream in a standard image file format. If the most recent message did not alter the image, then the image to be displayed will be an image that was associated with an earlier message in the message stream. Step 1350 may need to go backwards chronologically through the message stream to find the most recently transmitted image in the message stream. In some cases, even messages that transmit an alteration of an image will not contain a rendered image file containing the alteration. Instead, these messages may contain metadata explaining how the alteration/augmentation is to be made. It will then be up to the image-message app 232 to render a new version of the image based upon this metadata and the last image file actually sent in the message stream.

After the message stream has been displayed in step 1350, step 1355 then determines whether the user has asked to toggle the display between showing and hiding the message stream 340 (i.e., changing between the displays shown in FIGS. 8 and 9). This request to toggle the display can be made in a variety of ways, but in a preferred embodiment the request is made either by tapping on the image displayed on the touchscreen of the mobile device or by swiping the display with a finger. If this request is detected at step 1355, the display will toggle at step 1360 between hiding and showing the message stream 340. When the message stream 340 is hidden, the user sees the current image as shown in FIG. 9. If the message stream 340 contains multiple images, it is possible to let the user scroll between these images when in the image-only view of FIG. 9. This allows the user to quickly review all the images in the message stream 340 without having to traverse between individual messages.

As the user is viewing the message stream 340, the user may change which message is currently active. This can occur by touching a different message bubble on the touchscreen or by scrolling through the message stream. As explained above, in some embodiments this will cause the background image to switch so as to show the image appropriate for the active message text. Alternatively, the user may select a link 810 to see the altered image for a particular image-message. In either case, step 1365 recognizes the need to change the image, and step 1370 then updates the touchscreen with the new image.

Figure 14:
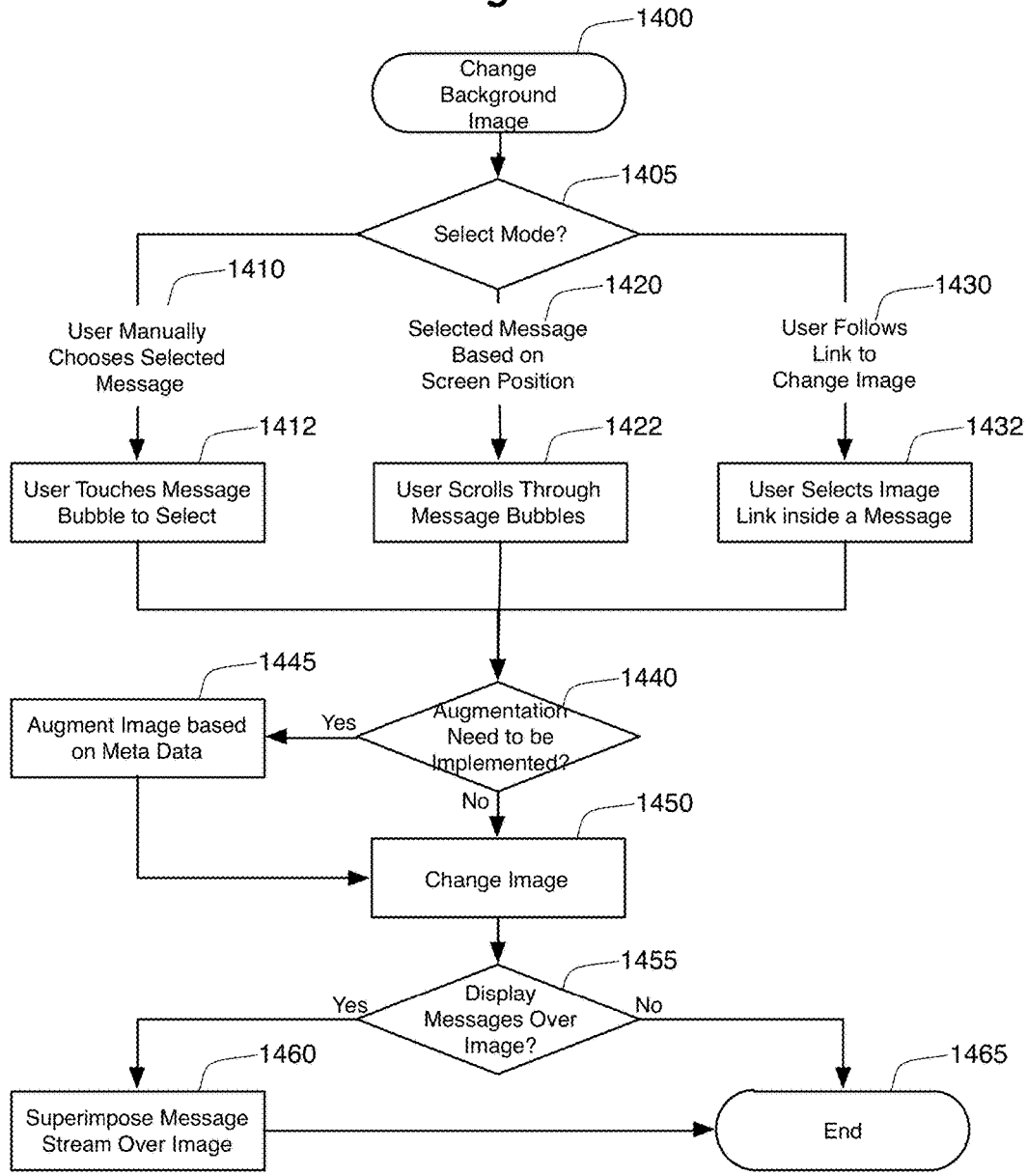
FIG. 14 is a flow chart showing a method having alternate steps for changing a background image of an image-message stream.

Additional details about steps 1365 and 1370 are shown in FIG. 14, which describes a method 1400 for updating a background image. The method 1400 starts by determining the particular mode by which the displayed image is changed at step 1405. FIG. 14 shows three modes:
 a first mode 1410 where a user manually selects a message bubble (step 1412), which causes the background visual element associated with the selected image-message to be displayed;
 a second mode 1420 where a user scrolls through a message stream 340 (step 1422), and the visual element associated with a message text at a particular location on the screen is displayed; and
 a third mode 1430 where the user follows a link 810 (step 1432) to select an image associated with a particular image-message.
Although FIG. 14 shows these modes operating in parallel, it is likely that a particular implementation of the image-message app 232 would use only one or two of these modes 1410, 1420, 1430.

Regardless of which mode 1410, 1420, 1430 is used, the method 1400 continues so as to alter the background visual element. To do this, step 1440 first determines whether the image-message app 232 needs to create the image augmentation by manipulating an image based on metadata, or whether the new visual element is found within a rendered image file associated with the selected image-message. As explained above, the image-message app 232 can choose to store image alterations as metadata rather than regenerate a new image incorporating the alteration. This minimizes the amount of data that must be sent between mobile devices. When it comes time to display the altered/augmented image, the app 232 will generate a new image based on the previous image using the metadata associated with the selected image. In FIG. 14, this occurs at step 1445. In other embodiments, every alteration of an image generates a new image that is transmitted along with the text of the image-message. In those embodiments, step 1445 can be skipped as it is not necessary to generate the image upon display if it was sent with the original message text. At step 1450, the new image is then presented on the touchscreen.

In FIG. 8, an image was shown with the message stream 340 superimposed on top of the image. As explained above, the user can toggle between this display and the display of FIG. 9, which does not contain the message stream 340. Method 1400 determines at step 1455 whether the message stream 340 is to be displayed. If not the method 1400 ends at step 1465. If so, the appropriate message text is superimposed over the image at step 1460 before the method 1400 ends. In several embodiments, the selected message in the message stream will be highlighted on the display to indicate which message text is currently determining the background image.

Returning to FIG. 13, after the correct background image is displayed as part of steps 1356 and 1370 (through method 1400), the image-message app 232 determines if the recipient wishes to respond to the received image-message. This takes place in step 1375. If so, the method 1300 returns to step 1315, where the user can augment the image (steps 1315 and 1320) and enter text (step 1325) for the reply message. As explained above, the reply message can alter the original image at step 1320 or replace the image altogether with a new image. If no reply is desired, the method 1300 ends at step 1380. In actuality, the method may loop back to step 1355 instead of ending at step 1380, allowing the user to toggle the display mode 1355, 1360 and change the displayed image 1365 numerous times as they peruse a message stream 340.

Metadata Constructions

FIG. 15 shows one embodiment of the components that make up an image-message 1500. In this example, the image-message 1500 includes a text message component 1510, an image component 1520, and an audio commentary comment 1530. In the preferred embodiment, these elements 1510-1530 are sent to the recipient using MMS messaging. The various elements 1510-1530 may be sent within a single message, or, more frequently, may each be sent in a separate message to the recipient. In addition, metadata 1540 is sent along with each element 1510-1530 of the image-message 1500.

The sending of metadata 1540 along with text 1510, images 1520, and audio commentary 1530 is a standard part of the transmission of multimedia components in MMS messaging. For example, image compression protocols such as JPG, GIF, and PNG routinely incorporate text-based metadata into the file structure used by that protocol. In contexts where a text message 1510 is not allowed to be transmitted with hidden metadata 1540, the metadata 1540 can be attached to the end of the text message 1510, such as in a closing parenthetical similar to "(W3h9a)". The image-messaging app 232 uses the metadata 1540 to help track the components of an image-message and also to link the image-message 1500 to particular data stored in the database 264 maintained by the image-message server 260. The preferred embodiment, for example, associates each component 1510-1530 of the image-message 1500 with metadata 1542 that identifies a particular message in a particular message stream. This allows the recipient mobile device app 232 to group the various elements 1510-1530 together into a single message, which in turn allows the components to be displayed as part of a single message bubble (such as message bubbles 342-346).

Metadata 1542 also allows the recipient app 232 to identify a particular message stream for the message. Although message streams are typically organized based on the participants, as is standard with most messaging applications, image-message streams are generally grouped around one or more images that are being discussed by the participants. For example, the participants of a first message stream may be discussing a canyon hiking trip. Several days later, the same participants may wish to discuss a shopping trip to a local mall. By assigning messages to a message stream through metadata 1542, the image-message app 232 can separate these various message streams. This prevents a canyon picture from being used as the background image 330 for the unrelated shopping mall message stream.

In addition to the message and stream identifier 1542, the system can include image specific metadata 1544 and audio specific metadata 1546. In one embodiment, the image metadata 1544 allows the recipient device to control the playback of any image augmentation in the manner selected by the user. For instance, zooming into a boxed area of an image can be coordinated with the playback of an audio commentary, or gesture augmentations over an image can be presented in the same order in which they were entered by the sender. The information necessary to render the image augmentations in this manner can be included in the image metadata 1544.

In some embodiments, an image-message 1500 that contains an image augmentation will contain an unaltered version of the image 1520. This allows the recipient image-message app 232 to uses the augmentation data 1544 to augment the original image file 1522 as desired. In other embodiments, the image 1520 being sent is the augmented image (e.g., what the image looks like after the augmentation has been applied). In order to present augmentations in an animated/video fashion, the receiving image-message app will need to download the unaltered image from the database 264 controlled by the image-message server 260. In this case, the message components 1510, 1520, 1530 can be found on the database 264 because the sending image-message app 232 transmits data relating to the image-message to the server 260 and database 264 every time the image-message 1500 is sent to a recipient (via MMS). The recipient app 232 will use the message and stream identifier 1542 from the metadata received via MMS to request the raw data for that message from the database 264. The server will use this message and stream identifier 1542 to recall the text message 1510, the original raw image 1522, instructions to accomplish the augmentation 1544, the audio commentary 1530, and the related audio metadata 1546. All of this information is then transmitted to the recipient app 232 for playback and animation of the image-message.

The use of the remote database 264 in this manner also allows the sending image-message app 232 to combine an image, an image augmentation, an audio commentary, and a text message into a video file for viewing by a recipient that is not using the app 232, as is explained in the parent applications. Recipients using the app 232 would need to receive only the message and stream identifier information 1542 (found in the video file metadata) to retrieve the data stored in database 264. The recipient app 232 would then ignore the received video file, and instead use the downloaded components 1510-1530 to render the image-message and grant the user full access and control over the received image-message.

Alternative Interface

Figure 16:
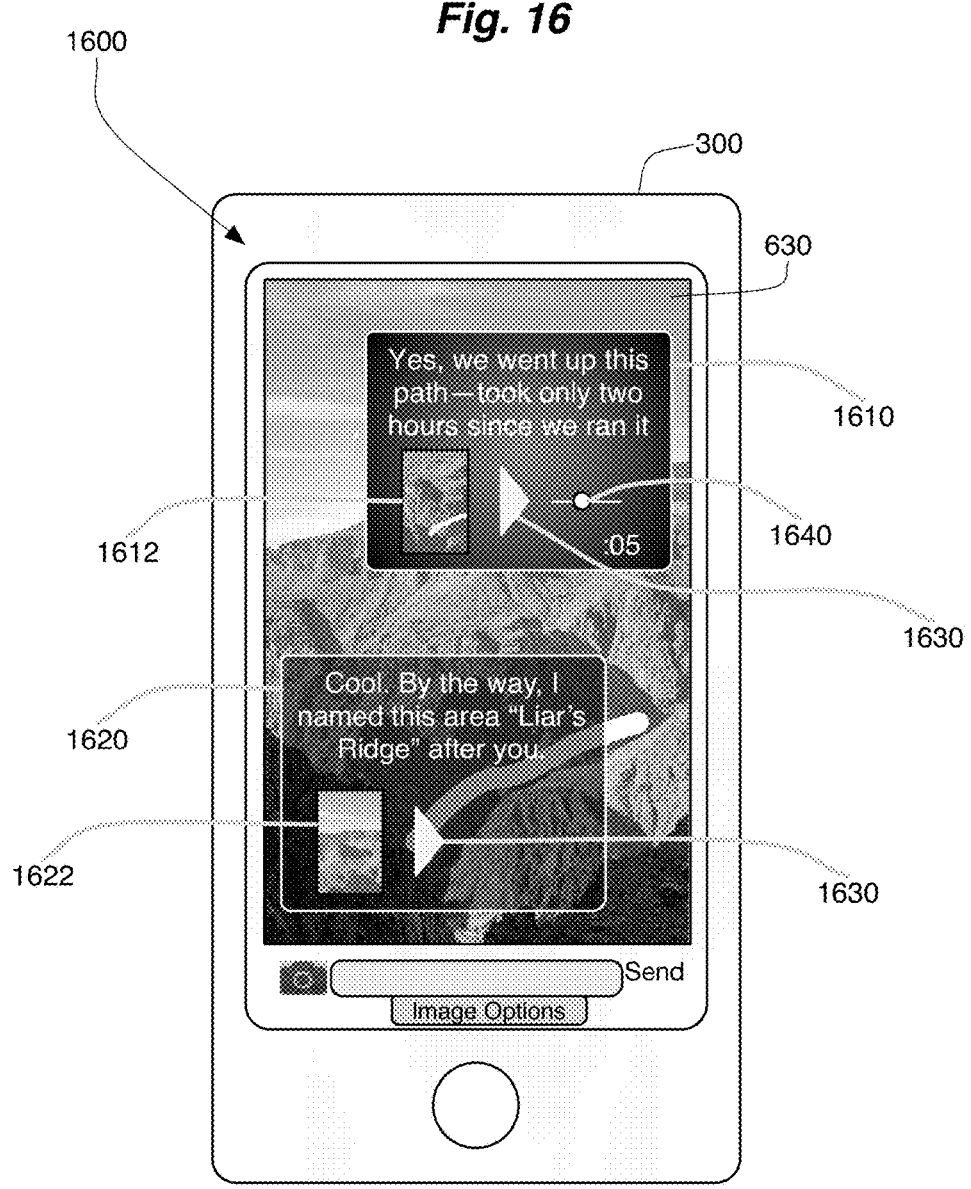
FIG. 16 is a plan view of the mobile device of FIG. 12 utilizing an alternative message stream interface.

FIG. 16 shows an alternative embodiment of the message stream interfaces described above. In this interface 1600, each message bubble 1610, 1620 that changes the image being discussed is presented with a thumbnail 1612, 1622 of the changed image within the message bubble 1610, 1620. In this way, the user can view the thumbnail images 1612, 1622 to determine which image is being discussed. Because the user can use the thumbnails to determine whether the message is discussing the image that is shown in the background 630 of the interface 1600, it is not necessary to highlight the selected message bubble 1610.

In this interface 1600, a play button icon 1630 is added to each message bubble 1610 containing a thumbnail 1612, 1622. A similar icon 1630 can be presented when the user has attached an audio commentary, even if the user has not altered the image. When a user wishes to view the new image or image augmentation, or to hear the audio associated with a particular message 1610, 1620, the user simply presses the play button icon 1630 associated with message 1610, 1620. In the interface shown in FIG. 1600, a scrubber tool 1640 is displayed while the animation or audio commentary is being presented to allow the user full control over the animation/audio commentary. Although not shown in FIG. 16, many embodiments would automatically change the play button icon 1630 into a "pause" or "stop" icon during playback to indicate that pressing the icon 1630 will stop the playback process.

The many features and advantages of the invention are apparent from the above description. Numerous modifications and variations will readily occur to those skilled in the art. It would be well within the scope of the present invention to implement these methods with only one or two of these three options available in that implementation. Since such modifications are possible, the invention is not to be limited to the exact construction and operation illustrated and described. Rather, the present invention should be limited only by the following claims.

What is claimed is:

1. A method comprising:
   a) at a computing device, identifying first and second textual commentary;
   b) at the computing device, identifying a first visual element related to the first textual commentary and a second visual element related to the second textual commentary;
   c) at the computing device, presenting the first and second textual commentary together;
   d) after step c) and at the computing device, receiving a first selection input selecting the first textual commentary, and then presenting the first and second textual commentary superimposed over the first visual element; and
   e) after step d) and at the computing device, receiving a second selection input selecting the second textual commentary, and then presenting the first and second textual commentary superimposed over the second visual element;
   f) at the first computing device, upon receiving an instruction to clear the commentaries, removing the first and second textual commentary and thereby presenting the currently displayed visual element without presenting the first and second textual commentary, and upon receiving an instruction to return the commentaries, redisplaying the first and second textual commentary superimposed over the currently displayed visual element.

2. The method of claim 1, wherein the first textual commentary is displayed in a first bubble that also includes a first thumbnail depiction of the first visual element and the second textual commentary is displayed in a second message bubble that also includes a second thumbnail depiction of the second visual element.

3. The method of claim 1, wherein the first selection input is a scrolling input, wherein textual commentaries are selected based on their location on a display during the scrolling.

4. The method of claim 1, wherein a currently selected textual commentary is visually distinguished from a non-selected textual commentary.

5. A method of communication between mobile devices comprising:
   a) at a first mobile device, receiving first and second textual messages from a second mobile device;
   b) at the first mobile device, identifying a first visual element related to the first textual message and a second visual element related to the second textual message;
   c) at the first mobile device, displaying the first and second textual messages together on a touchscreen display as a message stream;
   d) after step c) and at the first mobile device, receiving a first selection input from the touchscreen display selecting the first textual message, and then presenting the message stream superimposed over the first visual element on the touchscreen display;
   e) after step d) and at the first mobile device, receiving a second selection input from the touchscreen display selecting the second textual message, and then presenting the message stream superimposed over the second visual element on the touchscreen display; and
   f) at the first mobile device, upon receiving an instruction to clear the message stream from a currently displayed visual element, removing the message stream and thereby displaying the currently displayed visual element on the touchscreen display without presenting the message stream, and upon receiving an instruction to return the message stream, redisplaying the message stream superimposed over the currently displayed visual element.

6. The method of claim 5, wherein the instruction to clear the message stream is a swiping gesture received on the touchscreen display.

7. The method of claim 5, wherein the first selection input is a scrolling of the message stream, wherein textual messages are selected based on their location on the touchscreen display during the scrolling.

8. The method of claim 5, wherein a currently selected textual message is visually distinguished from a non-selected textual message.

9. The method of claim 5, wherein the first selection input is a touch on the first text message detected on the touchscreen display.

10. The method of claim 5, wherein the first selection input is a touch on a link associated with the first text message detected on the touchscreen display.

11. The method of claim 5, wherein the first textual message is displayed in a first message bubble that also includes a first thumbnail depiction of the first visual element and the second textual message is displayed in a second message bubble that also includes a second thumbnail depiction of the second visual element.

12. The method of claim 11, wherein the second visual element includes a non-static component chosen from a set comprising an animation and video content; further wherein the second message bubble further includes control interface elements to control a presentation of the non-static component of the second visual element.

13. The method of claim 5, further comprising:
   g) at the first mobile device, after receiving the first textual message, receiving user text input for a response textual message;
   h) at the first mobile device, receiving image alteration input to alter the first visual element into an altered visual element; and
   i) at the first mobile device, transmitting the response textual message and data sufficient to render the altered visual element to the second mobile device.

14. The method of claim 13, wherein the data sufficient to render the altered visual element is metadata describing the image alteration input.

15. The method of claim 13, wherein the data sufficient to render the altered visual element is a rendered image file.

16. The method of claim 5, wherein the first textual message was received in a first instant message.

17. The method of claim 16, wherein the first visual element was received in the first instant message and the second visual element was received in the second instant message.

18. The method of claim 16, wherein the first textual message includes a message identifier that uniquely identifies the first instant message, and wherein the step of identifying the first visual element related to the first textual message comprises:
   i) at the first mobile device, submitting a query to a remote server including the message identifier, and
   ii) at the first mobile device, receiving the first visual element related to the first textual message from the remote server in response to the query.

19. The method of claim 18, wherein the first visual element received from the remote server comprises a visual image and instructions for modifying the visual image, wherein the step of presenting the first visual element further comprises modifying the visual image according to the instructions for modifying.

* * * * *